(12) United States Patent
Matsuzaki et al.

(10) Patent No.: US 7,296,147 B2
(45) Date of Patent: Nov. 13, 2007

(54) AUTHENTICATION SYSTEM AND KEY REGISTRATION APPARATUS

(75) Inventors: Natsume Matsuzaki, Mino (JP); Makoto Tatebayashi, Takarazuka (JP); Kaoru Yokota, Ashiya (JP); Yuichi Futa, Osaka (JP); Motoji Ohmori, Hirakata (JP); Hirohito Kitatora, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 854 days.

(21) Appl. No.: 10/454,531

(22) Filed: Jun. 5, 2003

(65) Prior Publication Data

US 2004/0010688 A1   Jan. 15, 2004

(30) Foreign Application Priority Data

Jun. 11, 2002   (JP) .............................. 2002-170251

(51) Int. Cl.
*H04L 9/00* (2006.01)
*H04K 1/00* (2006.01)
*G06K 9/00* (2006.01)

(52) U.S. Cl. ...................... 713/155; 713/150; 713/169; 380/255; 726/10

(58) Field of Classification Search ...................... None
See application file for complete search history.

(56) References Cited

U.S. PATENT DOCUMENTS 5,016,276 A   5/1991 Matumoto et al.
6,850,914 B1*  2/2005 Harada et al. .............. 713/153
6,993,135 B2*  1/2006 Ishibashi .................... 711/163
2004/0006695 A1*  1/2004 Ishibashi et al. ........... 713/175

FOREIGN PATENT DOCUMENTS

EP   1037131   3/2000

OTHER PUBLICATIONS

"5C Digital Transmission Content Protection White Paper", Revision 1.0, Jul. 14, 1998, pp. i-14.
Brian Tung, "KERBEROS A Network Authentication System", Pearson Publishing, 1999, pp. 9-10.

\* cited by examiner

*Primary Examiner*—Gilberto Barrón, Jr.
*Assistant Examiner*—Abdulhakim Nobahar
(74) *Attorney, Agent, or Firm*—Wenderoth, Lind & Ponack L.L.P.

(57) ABSTRACT

In an authentication system, a key registration apparatus receives input of an identifier unique to a second device, generates first key data from the identifier according to a predetermined key generation algorithm, and transmits the generated first key data to a first device, which receives and stores the first key data, and authenticates the second device with use of the first key data. The second device stores in advance second key data generated from the identifier according to the predetermined key generation algorithm, and is authenticated by the first device with use of the second key data. Accordingly, the first and second devices cannot be registered without using the key registration apparatus, thereby preventing communication with unregistered devices. This enables usage of content to be limited to individual usage in the home of a user, and can be realized even with devices that are not connected outside the home.

6 Claims, 19 Drawing Sheets

AUTHENTICATION SYSTEM AND KEY REGISTRATION APPARATUS

This application is based on an application No. 2002-170251 filed in Japan, the content of which is hereby incorporated by reference.

BACKGROUND OF THE INVENTION (1) Field of the Invention

The present invention relates to a system in which encryption authentication communication is performed between a plurality of devices.

(2) Description of the Related Art

Content distribution services that distribute various music and movies using packaged media, the Internet or broadcasting have become prevalent in recent years. Such services require content protection techniques that reflect the wishes of the protector of copyright of the content. The protector may wish, for example, to charge for the content distribution service, and to limit the content to individual usage in homes of users who have a content distribution contract. Alternatively, the protector may wish to prohibit transmission of the content over the Internet, since the Internet can be accessed by numerous unspecified users.

DTCP (Digital Transmission Content Protection) is one system that offers a content protection technique for realizing the wishes of the content copyright protector. In DTCP, digital content is distributed via a bus specified by IEEE1394, which is one specification for a high-speed serial bus. DTCP is described in detail in Document 1.

In DTCP, encryption authentication communication is performed between mutually connected devices that comply to DTCP specifications, under the management of a manager called a DTLA (Digital Transmission Licensing Administrator, LLC). The encryption authentication works as follows.

(1) A transmission apparatus and a reception apparatus both have an individual secret key distributed by the DTLA based on a contract with the DTLA. Note that devices to which the secret key is distributed use a prescribed secret key management implementation method. Furthermore, transmission of content over the Internet is prohibited by the DTCP contract.

(2) The transmission apparatus and the reception apparatus perform mutual authentication using the secret key. Furthermore, the transmission apparatus encrypts content that requires protection, using a key that has been shared in authentication, and transmits the encrypted content to the reception apparatus.

(3) The transmission apparatus gives each of a maximum of 63 reception devices a key for decrypting the content. Individual usage of content can be easily realized by AVC command restrictions and device number restrictions specified by IEEE1394.

The following describes an outline of an authentication system that uses Kerberos. Note that Kerberos is described in detail in Document 2.

In Kerberos, legal devices are registered in advance in a Kerberos server. As one example, in order to use content, a device first accesses the Kerberos server, receives a first authentication from the Kerberos server based on registered information, and obtains a ticket (initial ticket) that is valid for that day from the Kerberos server. Next, the device accesses a server that provides a service, presents the initial ticket received from the Kerberos server, receives a second authentication from the server, and then uses the content.

In this way, in Kerberos, a registered device is able to use any service freely within the determined validity period by being authenticated twice.

However, neither of the above-described methods enable differentiation between home devices and external devices, and therefore do not enable limitation of individual usage inside the home of a user who has a content distribution contact.

<Document 1>

5C Digital Transmission Content Protection White Paper, Revision 1.0, Jul. 14, 1998

<Document 2>

Tung, Brian KERBEROS Network Ninsho System (KERBEROS: A Network Authentication System), trans. Kuwamura, Jun, Pearson Publishing, 1999

SUMMARY OF THE INVENTION

In view of the described problems, the object of the present invention is to provide an authentication system and a key registration apparatus that enable a device in the home of a user to be easily set in order to limit usage of content to individual usage in the home.

In order to achieve the stated object, the present invention is an authentication system including a first device and a second device that perform authentication, and a key registration apparatus, wherein the key registration apparatus receives input of an identifier unique to the second device, generates first key data from the identifier according to a predetermined key generation algorithm, and transmits the generated first key data to the first device, the first device receives the first key data, stores the received first key data, and authenticates the second device with use of the first key data, and the second device stores in advance second key data generated from the identifier according to the predetermined key generation algorithm, and is authenticated by the first device with use of the second key data.

According to the stated structure, the second device cannot be registered to the first device without using the key registration apparatus, thereby preventing communication with unregistered devices. This enables usage of content to be limited to individual usage in the home of a user. Furthermore, by using the key registration apparatus, the first key data can be easily set in the first device.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes details of embodiments of the present invention with use of the drawings.

1. First Embodiment

1.1 Structure of Authentication System 1100

Figure 1:
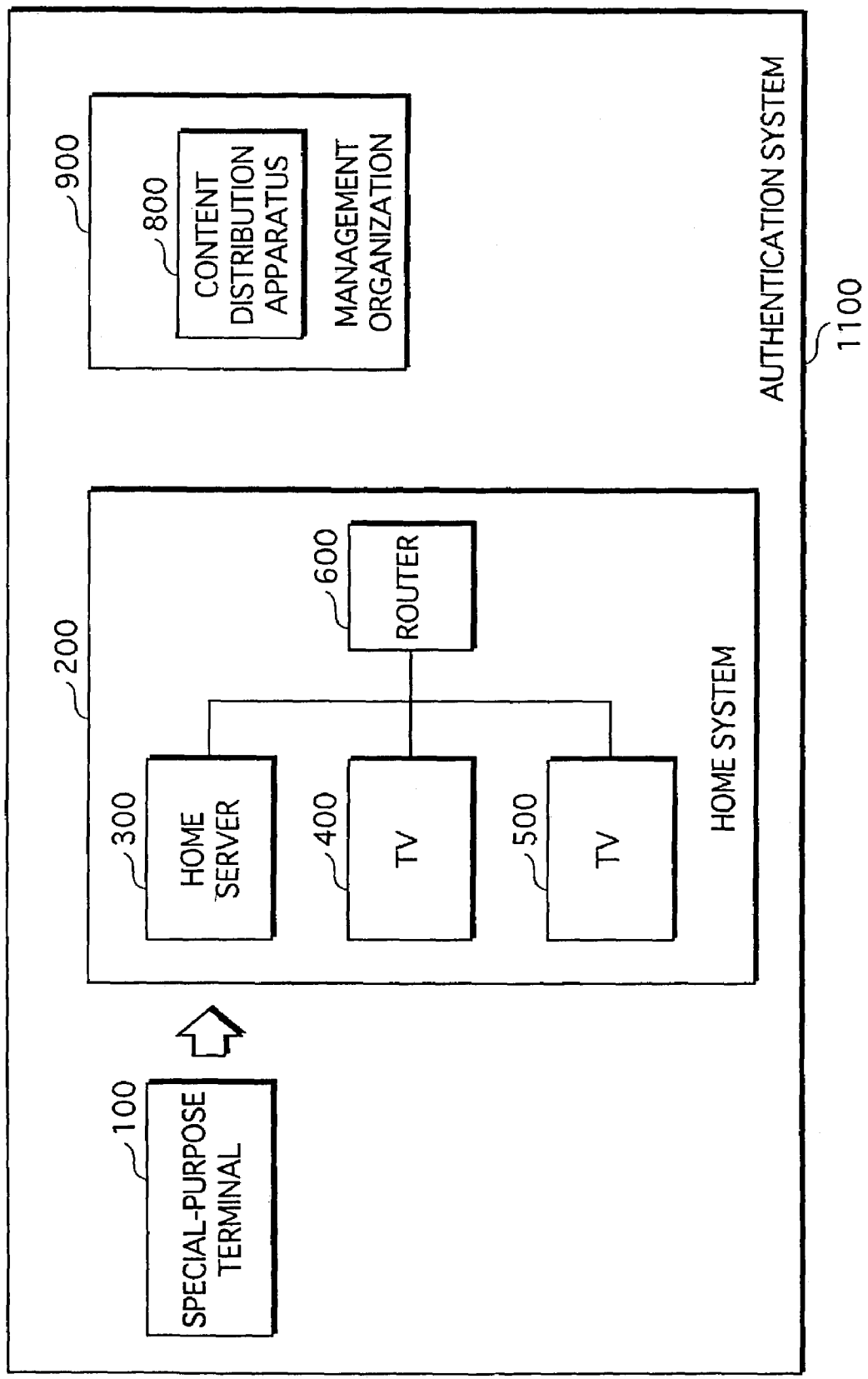
FIG. 1 is a block diagram showing the overall structure of an authentication system 1100.

As shown in FIG. 1, the authentication system 1100 is composed of a special-purpose terminal (hereinafter referred to simply as a "terminal") 100, a home system 200, and a content distribution apparatus 800. The home system 200 is composed of a home server 300, a TV 400, a TV 500, and a router 600.

A management organization 900 that provides content to users for a fee has the terminal 100 and the content distribution apparatus 800. The content distribution apparatus 800 provides content by recording the content on recording media. Note that when the home system 200 and the content distribution apparatus 800 are connected via a network, content may be distributed via the network.

The user has the home system 200 in his/her home.

A service technician takes the terminal 100 to the user's home after being instructed to visit the home by the management organization 900, and connects the terminal 100 to the home server 300 via a special-purpose interface. Note that the terminal 100 may instead be connected to the home server 300 via a general-purpose interface such as a USB.

The terminal 100 receives, as input from outside, a device identifier ID4 that is an ID unique to the TV 400, generates an authentication key Key14 from the device identifier ID4, and transmits the generated authentication key Key14 and the device identifier ID4 to the home server 300. The home server 300 stores the authentication key Key14 and the device identifier ID4 in correspondence.

The TV 400 stores the authentication key Key14 in advance. When the user has the TV 400 play back the content, the home server 300 authenticates the TV 400 using the authentication key Key14, and transmits the content to the TV 400 when the authentication is successful. The TV 400 receives and then plays back the content.

In this way, the user is able to enjoy the content.

The following describes the various compositional elements of the authentication system 1100 in detail.

1.1.1 Terminal 100

The terminal 100 is an apparatus for registering the device identifier ID4 and the authentication key Key14 of the TV 400 in the home server 300. The terminal 100 is held by the service technician who has received the instruction from the management organization 900. The service technician confirms that the TV 400 is in the home, and subsequently uses the terminal 100 to set the TV 400 to be able to use content with a device that has a pre-determined content protection function.

Figure 2:
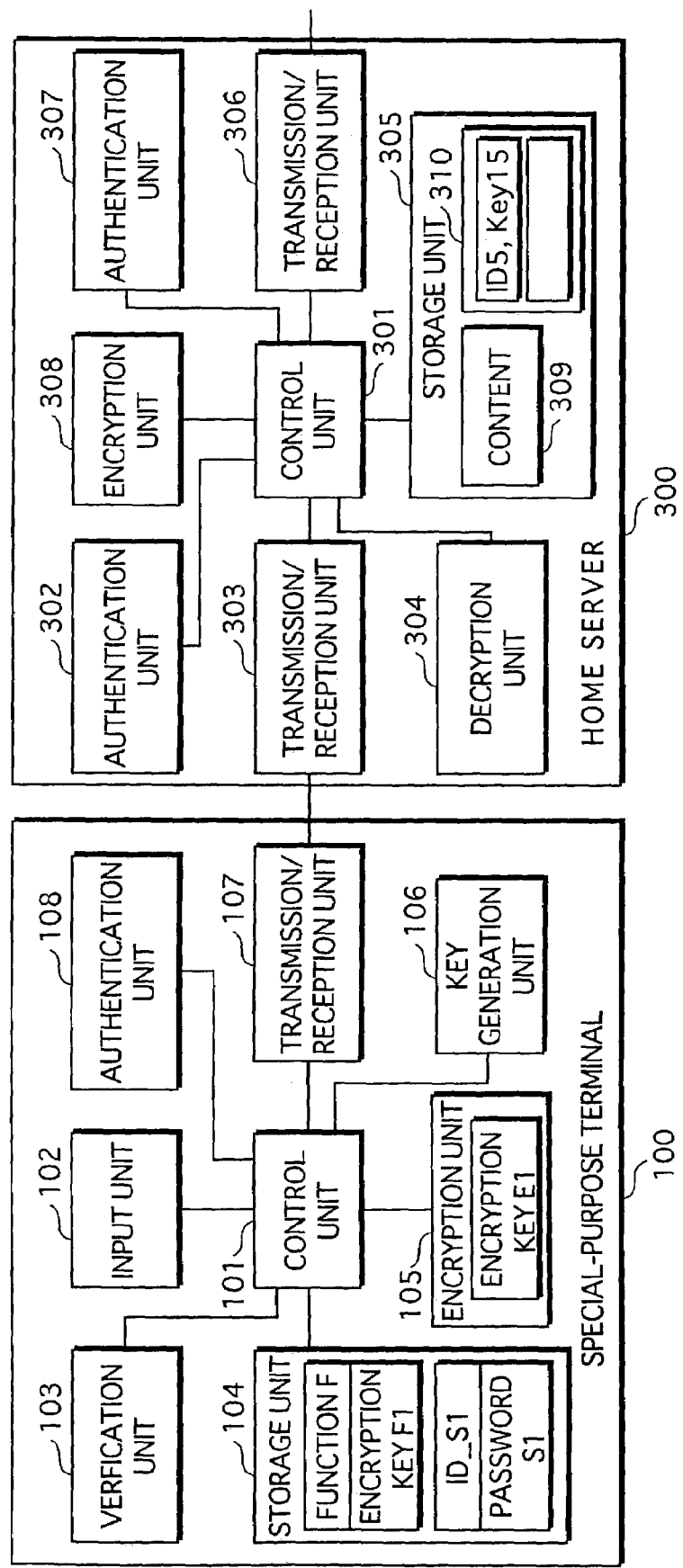
FIG. 2 is a block diagram showing the structure of a special-purpose terminal 100 and a home server 300.

As shown in FIG. 2, the terminal 100 is composed of a control unit 101, an input unit 102, a verification unit 103, a storage unit 104, an encryption unit 105, a key generation unit 106, a transmission/reception unit 107, and an authentication unit 108.

The following describes each structural component in detail.

(1) Storage Unit 104

The storage unit 104 stores a service technician identifier ID_S1, a password S1 and a function F. Furthermore, the storage unit 104 stores an encryption key F1 for encrypting the device identifier ID4 with use of the function F.

Here, the function F is, for example, a DES encryption algorithm. Since DES is commonly known, a description is omitted here.

The service technician identifier ID_S1 is an ID that is unique to the service technician who uses the terminal 100. The password S1 is for using the terminal 100, and is known only by the service technician.

The service technician identifier ID_S1 and the password S1 limit the party who is able to use the terminal 100 to the service technician.

(2) Input Unit 102

The input unit 102 receives inputs of the service technician identifier ID_S1, the password S1, and the device identifier ID4, according to operations by the service technician, and outputs the received data to the control unit 101.

(3) Verification Unit 103

The verification unit 103 verifies in the following way whether the service technician has permission to use the terminal 100.

The verification unit 103 receives the service technician identifier ID_S1 and the password S1 from the control unit 101, and reads the ID and the password stored in the storage unit 104. The verification unit 103 verifies whether the received service technician identifier ID_S1 and password S1 match the read ID and password, and outputs a verification result to the control unit 101.

(4) Authentication Unit 108

The authentication unit 108 performs mutual authentication with the home server 300. As one example, mutual authentication is performed according to the challenge-response method using common information. Since the challenge-response method is well known, a description thereof is omitted here.

The authentication unit 108 outputs an authentication result to the control unit 101.

(5) Key Generation Unit 106

The key generation unit 106 receives the device identifier ID4 from the control unit 101, reads the function F from the storage unit 104, and generates the authentication key Key14 from the device identifier ID4 using the read function F.

Here, the authentication key Key14 is expressed as authentication key Key14=F (F1, ID4). F(A,B) represents encrypting B using an encryption key A.

The key generation unit 106 outputs the generated authentication key Key14 to the control unit 101.

(6) Encryption Unit 105

The encryption unit 105 has an encryption key E1.

The encryption unit 105 receives the device identifier ID4 and the authentication key Key14 from the control unit 101, and encrypts the received device identifier ID4 and authentication key Key14 based on the encryption algorithm E, to generate an encrypted device identifier ID 4 and an encrypted authentication key Key14. Here, the encrypted device identifier ID4 is expressed as encrypted device identifier ID4=E (E1, ID4). Furthermore, the encrypted authentication key Key14 is expressed as encrypted authentication key Key14=E (E1, Key14). E(A,B) represents encrypting B using an encryption key A.

As one example, the encryption algorithm E is an RSA encryption algorithm. Since RSA is well known, a description thereof is omitted here.

The encryption unit 105 outputs the encrypted device identifier ID4 and the encrypted authentication key Key14 to the control unit 101.

(7) Transmission/Reception Unit 107

The transmission/reception unit 107 transmits and receives data to and from the home server 300. The transmission/reception unit 107 receives the encrypted device identifier ID4 and the encrypted authentication key Key14 from the control unit 101, and transmits the received encrypted device identifier ID4 and encrypted authentication key Key14 to the home server 300.

(8) Control Unit 101

The control unit 101 receives the service technician identifier ID_S1 and the password S1 from the input unit 102, and has the verification unit 103 verify the received service technician identifier ID_S1 and password S1. The control unit 101 receives a verification result from the verification unit 103, and judges whether the verification result is successful or not. When the verification result is not successful, the control unit 101 ends the processing, and when the verification result is successful, the control unit 101 continues processing.

The control unit 101 receives the device identifier ID4 from the input unit 102, and has the authentication unit 108 perform mutual authentication with the home server 300. The control unit 101 receives an authentication result from the authentication unit 108, and judges whether the authentication result is successful or not. When the authentication result is not successful, the control unit 101 ends the processing, and when the authentication result is successful, the control unit 101 outputs the device identifier ID4 to the key generation unit 106, and has the key generation unit 106 generate a key. The control unit 101 receives the authentication key Key14 from the key generation unit 106, and outputs the received authentication key Key14 and device identifier ID4 to the encryption unit 105.

The control unit 101 transmits the encrypted device identifier ID4 and the encrypted authentication key Key14 received from the encryption unit 105 to the home server 300 via the transmission/reception unit 107.

1.1.2 Home Server 300

The home server 300 is a device that is authorized by the management organization, and stores content. The home server 300 authenticates the TV 400 or the TV 500 using a key registered by the terminal 100, and transmits the stored content to the authenticated TV.

As shown in FIG. 2, the home server 300 is composed of a control unit 301, an authentication unit 302, a transmission/reception unit 303, decryption unit 304, a storage unit 305, a transmission/reception unit 306, an authentication unit 307, and an encryption unit 308.

The following describes each of the compositional elements.

(1) Storage Unit 305

The storage unit 305 is composed of a storage area 309 and a storage area 310. The storage area 310 cannot be observed or modified from outside.

The storage area 309 stores content.

The storage area 310 stores the registered TV 500 device identifier ID5 and authentication key Key15 in correspondence. Furthermore, the storage area 310 also has an area for storing the TV 400 device identifier ID4 and authentication key Key14 that are received from the terminal 100.

(2) Transmission/Reception Unit 303

The transmission/reception unit 303 is physically connected to the terminal 100, and transmits and receives data to and from the terminal 100.

(3) Authentication Unit 302

The authentication unit 302 performs mutual authentication with the terminal 100. As one example, mutual authentication is performed according to the challenge-response method using common information. The authentication unit 302 outputs an authentication result to the control unit 301.

(4) Decryption Unit 304

The decryption unit 304 decrypts the encrypted device identifier ID4 and the encrypted key Key14 received from the control unit 301, in accordance with a decryption algorithm D, to generate a device identifier ID4 and an authentication key Key14. Here, the decryption algorithm D performs the inverse process of the encryption algorithm E.

The decryption unit 304 outputs the device identifier ID4 and the authentication key Key14 to the control unit 301.

(5) Transmission/Reception Unit 306

The transmission/reception unit 306 transmits and receives data to and from the TV 400 and the TV 500 via the router 600.

(6) Authentication Unit 307

When distributing content to the TV 400, the authentication unit 307 authenticates the TV 400 using the device identifier ID4 and the authentication key Key14, and shares a session key with the TV 400.

As one example, authentication and session key sharing are performed as follows.

The authentication unit 307 generates a random number r1, transmits the random number r1 to the TV 400, and subsequently receives an encrypted r1r2 from the TV 400. The encrypted r1r2 has been generated by the TV 400 by generating a random number r2, concatenating the random numbers r1 and r2 to form r1r2, and encrypting r1r2 using the authentication key Key14. The authentication unit 307 decrypts the received encrypted r1r2, and authenticates the TV 400 by deriving the original random number r1 from the decrypted r1r2.

Furthermore, the authentication unit 307 outputs the random number r2 derived from the decrypted data r1r2 to the encryption unit 308 as the session key.

When distributing content to the TV 500, the authentication unit 307 shares a session key with the TV 500 in the same way.

(7) Encryption Unit 308

The encryption unit 308 encrypts the content stored in the storage area 309.

The encryption unit 308 encrypts the content to be distributed to the TV 400 using the session key r2 derived by the authentication unit 307 when authenticating the TV 400, to generate encrypted content. The encryption unit 308 then outputs the encrypted content to the control unit 301.

The encryption unit 308 also encrypts content to be distributed to the TV 500 using a session key derived in the same way.

(8) Control Unit 301

On the terminal 100 being connected, the control unit 301 has the authentication unit 302 perform mutual authentication with the terminal 100. The control unit 301 receives an authentication result from the authentication unit 302, and judges whether the authentication result is successful. When the authentication result is not successful, the control unit 301 ends processing, and when the authentication result is successful, the control unit 301 continues the processing. The control unit 301 receives the encrypted device identifier ID4 and the encrypted authentication key Key14 from the terminal 100 via the transmission/reception unit 303, outputs the received encrypted device identifier ID4 and encrypted authentication key Key14 to the decryption unit 304, and has the decryption unit 304 decrypt the encrypted device identifier ID4 and the encrypted authentication key Key14.

The control unit 301 receives the decrypted device identifier ID4 and the decrypted authentication key Key14 from the decryption unit 304, and writes the received device identifier ID4 and authentication key Key14 in correspondence to the storage area 310.

When distributing content to the TV 400, the control unit 301 has the authentication unit 307 authenticate the TV 400. The control unit 301 receives an authentication result from the authentication unit 307, and judges whether the authentication result is successful or not. When the authentication result is not successful, the control unit 301 ends distribution of the content, and when the result is successful, the control unit 301 has the encryption unit 308 encrypt the content. The control unit 301 receives the encrypted content from the encryption unit 308, and distributes the encrypted content to the TV 400 via the transmission/reception unit 306.

The control unit 301 processes in the same way when distributing content to the TV 500.

1.1.3 TVs 400 and 500

The TVs 400 and 500 are authorized in advance by the management organization 900.

The TV 400 has the device identifier ID4, which is unique to the TV 400 and set by the management organization 900, displayed in a place that is visible from outside.

Figure 3:
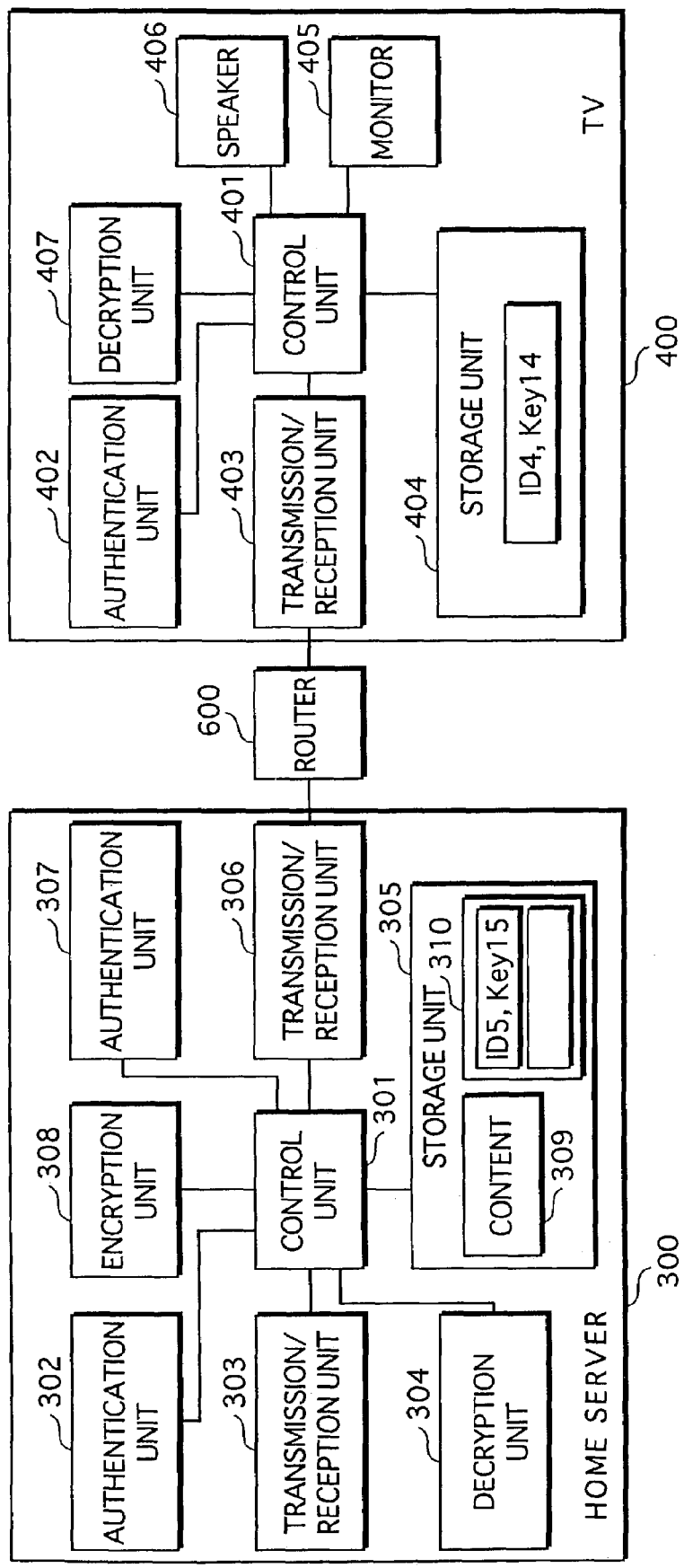
FIG. 3 is a block diagram showing the structure of the home server 300 and a TV 400.
Figure 4:
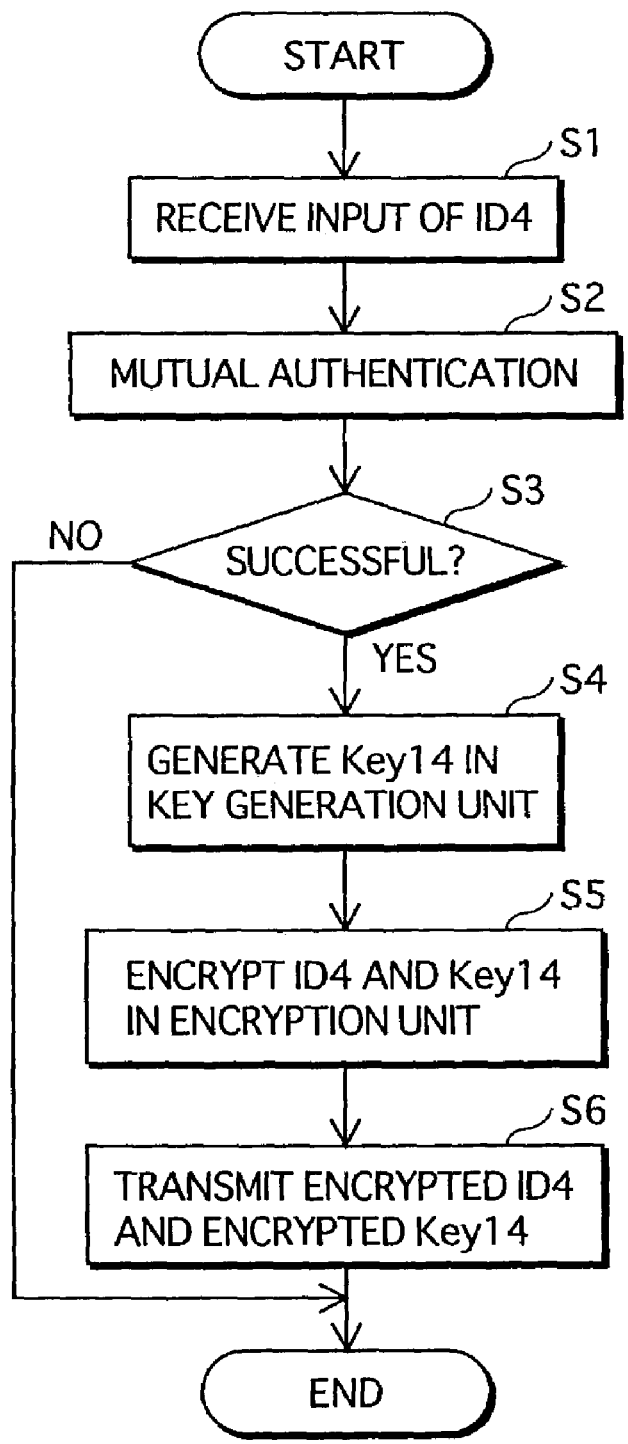
FIG. 4 is a flowchart showing operations by a control unit 101.

As shown in FIG. 3, the TV 400 is composed of a control unit 401, an authentication unit 402, a transmission/reception unit 403, a decryption unit 407, a storage unit 404, a monitor 405, and a speaker 406. The TV 500 has the same structure. Note that the home server 300, the router 600 and the TV 400 are shown as being in a row in FIG. 3 for the sake of simplicity.

The following describes each of the compositional elements.

(1) Storage Unit 404

The storage unit 404 is a storage area that is unable to be observed or modified from outside. The storage unit 404 stores the device identifier ID4 that is unique to the TV 400, and the authentication key Key14. The authentication key Key14 has been generated from the device identifier ID4 using a secret function F.

(2) Authentication Unit 402

The authentication unit 402 performs mutual authentication with the home server 300.

The authentication unit 402 receives the random number r1 via the transmission/reception unit 403, and reads the authentication key Key14 from the storage unit 404. The authentication unit 402 then generates the random number r2, concatenates the random numbers r1 and r2 to generate data r1r2, and encrypts the generated data r1r2 using the read authentication key Key14, to generate encrypted data r1r2. The authentication unit 402 transmits the encrypted data r1r2 to the home server 300 via the transmission/reception unit 403.

The authentication unit 402 outputs the generated random number r2 to the decryption unit 407 as the session key.

The authentication unit 402 outputs the authentication result to the control unit 401.

(3) Decryption Unit 407

The decryption unit 407 receives the encrypted content via the transmission/reception unit 403, and decrypts the received encrypted content using the session key r2 generated by the authentication unit 402. The decryption unit 407 then outputs the decrypted content to the control unit 401.

(4) Monitor 405

The monitor 405 displays image data received from the control unit 401.

(5) Speaker 406

The speaker 406 outputs audio data received from the control unit 401.

(6) Transmission/Reception Unit 403

The transmission/reception unit 403 transmits and receives data to and from the home server 300 via the router 600.

(7) Control Unit 401

The control unit 401 has the authentication unit 402 perform mutual authentication with the home server 300 via the transmission/reception unit 403. The control unit 401 receives an authentication result form the authentication unit 402, judges whether the authentication result is successful or not, and ends processing when the authentication result is not successful.

The control unit 401 has the decryption unit 407 decrypt encrypted content received from the home server 300 via the transmission/reception unit 403. The control unit 401 receives decrypted content from the decryption unit 407, and outputs the decrypted content to the monitor 405 and the speaker 406.

1.2 Operations by the Authentication System 1100

1.2.1 Operations When Registering the TV 400 in the Home Server 300 Using the Terminal 100

The following describes operations when a service technician who has the terminal 100 registers the TV 400 in the home server 300 of the home system 200. Note that the TV 500 is already registered in the home server 300.

The service technician takes the terminal 100 to the user's home. When usage of content is permitted with an individual usage range, the service technician confirms that the TV 400 is in the home, and performs registration processing.

Before registering the TV 400 in the home server 300, the service technician inputs his/her service technician identifier ID_S1 and the password S1. The control unit 101 of the terminal 100 receives input of the service technician ID_S1 and the password S1 via the input unit 102, and has the verification unit 103 verify the service technician identifier ID_S1 and the password S1. On receiving a verification result from the verification unit 103, the control unit 101 judges whether the verification result is success or not. The registration processing ends when the verification result is not success, and continues when the verification result is success.

The terminal 100 is connected by the service technician to the home server 300. When the input unit 102 receives an input of the device identifier ID4 (step S1), the control unit 101 has the authentication unit 108 perform mutual authentication with the home server 300 (step S2). The control unit 101 receives an authentication result from the authentication unit 108, and judges whether the authentication result is successful or not (step S3). When the authentication result is not successful (step S3, NO) the processing ends. When the authentication result is successful (step S3, YES), the control unit 101 has the key generation unit 106 generate a key (step S4). The control unit 101 receives the generated authentication key Key14 from the key generation unit 106, and has the encryption unit 105 encrypt the device identifier ID4 and the authentication key Key14 (step S5). The control unit 101 then transmits the encrypted device identifier ID4 and the encrypted authentication key Key14 to the home server 300 via the transmission/reception unit 107 (step S6).

1.2.2 Operations When the Home Server 300 Registers a Key

Figure 5:
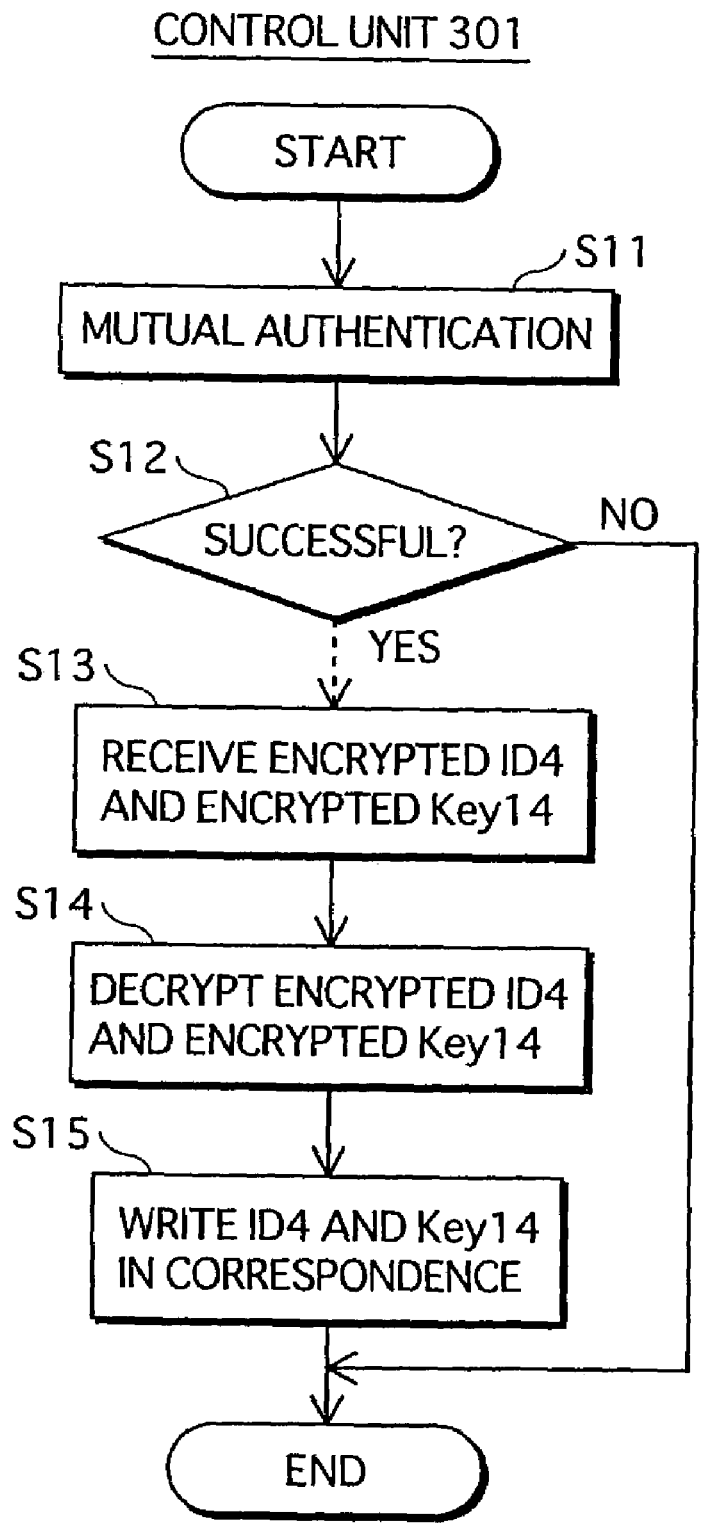
FIG. 5 is a flowchart showing operations when a control unit 301 registers a key.

The following describes with use of FIG. 5 operations when the home server 300 writes information received from the terminal 100.

The control unit 301 of the home server 300 has the authentication unit 302 perform mutual authentication with the terminal 100 (step S11). On receiving an authentication result from the authentication unit 302, the control unit 301 judges whether the authentication result is successful or not (step S12), and when the authentication result is not successful (step S12, NO), the processing ends. When the authentication result is successful (step 512, YES), the control unit 301 waits for data to be transmitted from the terminal 100.

The control unit 301 receives the encrypted device identifier ID4 and the encrypted authentication key Key14 from the terminal 100 via the transmission/reception unit 303 (step S13), and has the decryption unit 304 decrypt the encrypted device identifier ID4 and the encrypted authentication key Key14 (step S14). The control unit 301 writes the decrypted device identifier ID4 and authentication key Key14 in correspondence to the storage area 310 (step S15).

1.2.3 Operations When the Home Server 300 Distributes Content to the TV 400

Figure 6:
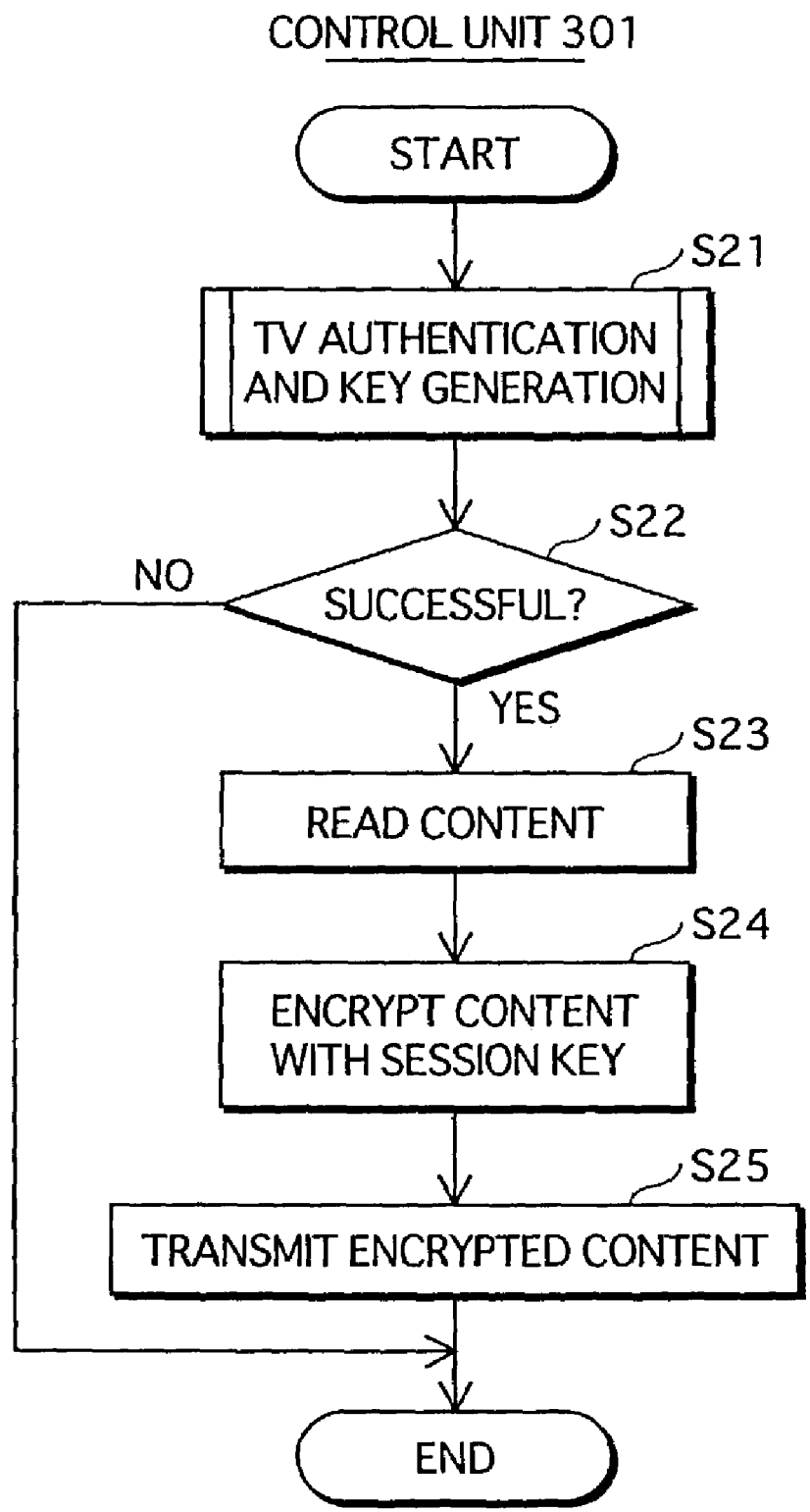
FIG. 6 is a flowchart showing operations when the control unit 301 distributes content to the TV 400.

The following describes with use of FIG. 6 operations when the home server 300 distributes content to the TV 400.

The control unit 301 of the home server 300 has the authentication unit 307 authenticate the TV 400 (step S21).

The control unit 301 receives an authentication result from the authentication unit 307, and judges whether the authentication result is successful or not (step S22). When the authentication result is not successful (step S22, NO), the processing ends. When the authentication result is successful (step S22, YES), the control unit 301 reads the content stored in the storage area 309 (step S23), has the encryption unit 308 encrypt the read content using the session key derived in authentication (step S24), and distributes the encrypted content to the TV 400 via the transmission/reception unit 306 (step S25).

1.2.4 Operations When the Home Server Authenticates the TV 400

Figure 7:
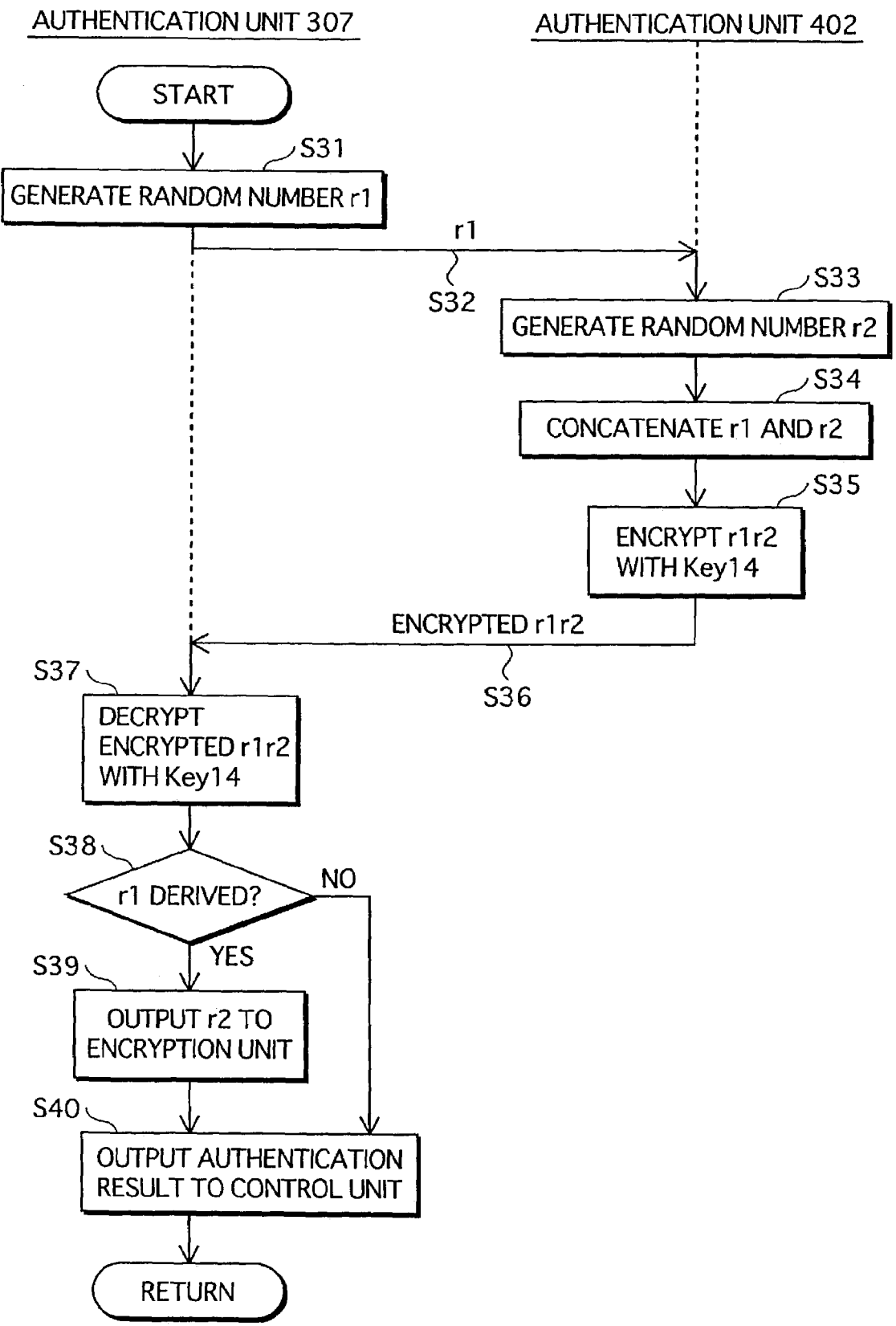
FIG. 7 is a flowchart showing operations in mutual authentication between an authentication unit 307 and an authentication unit 402.

The following describes with use of FIG. 7 operations when the home server 300 authenticates the TV 400 (step S21).

The authentication unit 307 of the home server 300 generates a random number r1 (step S31), and transmits the generated random number r1 to the TV 400 via the transmission/reception unit 306 (step S32).

The authentication unit 402 of the TV 400 receives the random number r1 via the transmission/reception unit 403, generates a random number r2 (step S33), concatenates the received r1 and the generated r2 (step S34), and encrypts the concatenated r1r2 using the authentication key Key14 (step S35). The authentication unit 402 transmits the encrypted r1r2 to the home server 300 via the transmission/reception apparatus 403 (step S36).

The authentication unit 307 of the home server 300 decrypts the received encrypted r1r2 using the authentication key Key14, and derives r1r2 (step S37), and judges whether r1 was derived from the decrypted data (step S38). When r1 is not derived (step S38, NO), the authentication unit 307 outputs an authentication result showing that authentication was not successful to the control unit 301 (step S40). When r1 is derived (step S38, YES), the authentication unit 307 outputs r2 to the encryption unit 308 (step S39), and outputs an authentication result showing that authentication was successful to the control unit 301 (step S40).

2. Second Embodiment

In the first embodiment, a problem arises when, for example, the service technician loses a special-purpose terminal by which a key has been registered and there is a possibility that the terminal may be used illegally. The problem is that it is not possible to distinguish between a key that was registered before the terminal was lost and a key that was registered after the terminal was lost. The following describes an authentication system 1200 that enables a key registered by the terminal that might be used illegally to be revoked.

2.1 Structure of the Authentication System 1200

Figure 8:
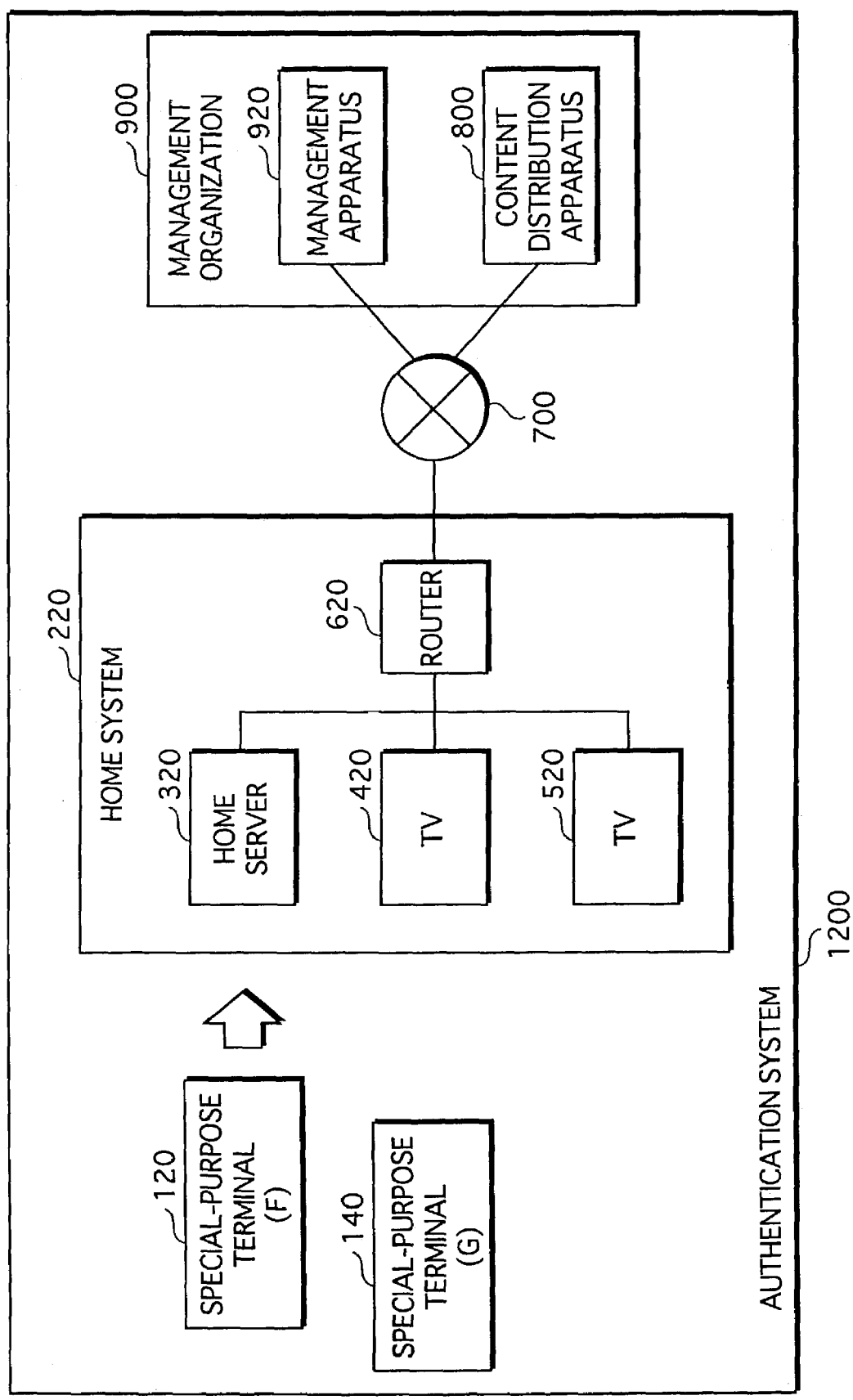
FIG. 8 is a block diagram showing the overall structure of an authentication system 1200.

As shown in FIG. 8, the authentication system 1200 is composed of special-purpose terminals (hereinafter referred to simply as "terminal(s)") 120 and 140, a home system 220, the Internet 700, a management apparatus 920, and the content distribution apparatus 800. The home system 220 is composed of a home server 320, a TV 420, a TV 520, and a router 620.

The management apparatus 920 and the content distribution apparatus 800 are connected to the router 620 via the Internet 700.

The following describes the structure of the authentication system 1200 that differs from the authentication system 1100.

2.1.1 Management Apparatus 920

The management apparatus 920 issues revocation information. The revocation information is for revoking a terminal that might be used illegally and keys registered in the terminal. The revocation information is composed of the unique ID of the revoked terminal, and digital signature data generated by applying a digital signature algorithm S to the ID. Here, the digital signature algorithm S is based on the ElGamal Signature scheme which uses a discrete logic problem based on a finite field as a basis for security. Since the ElGamal signature scheme based on a discrete field is commonly known, a description is omitted here.

2.1.2 Terminal 120

Figure 15:
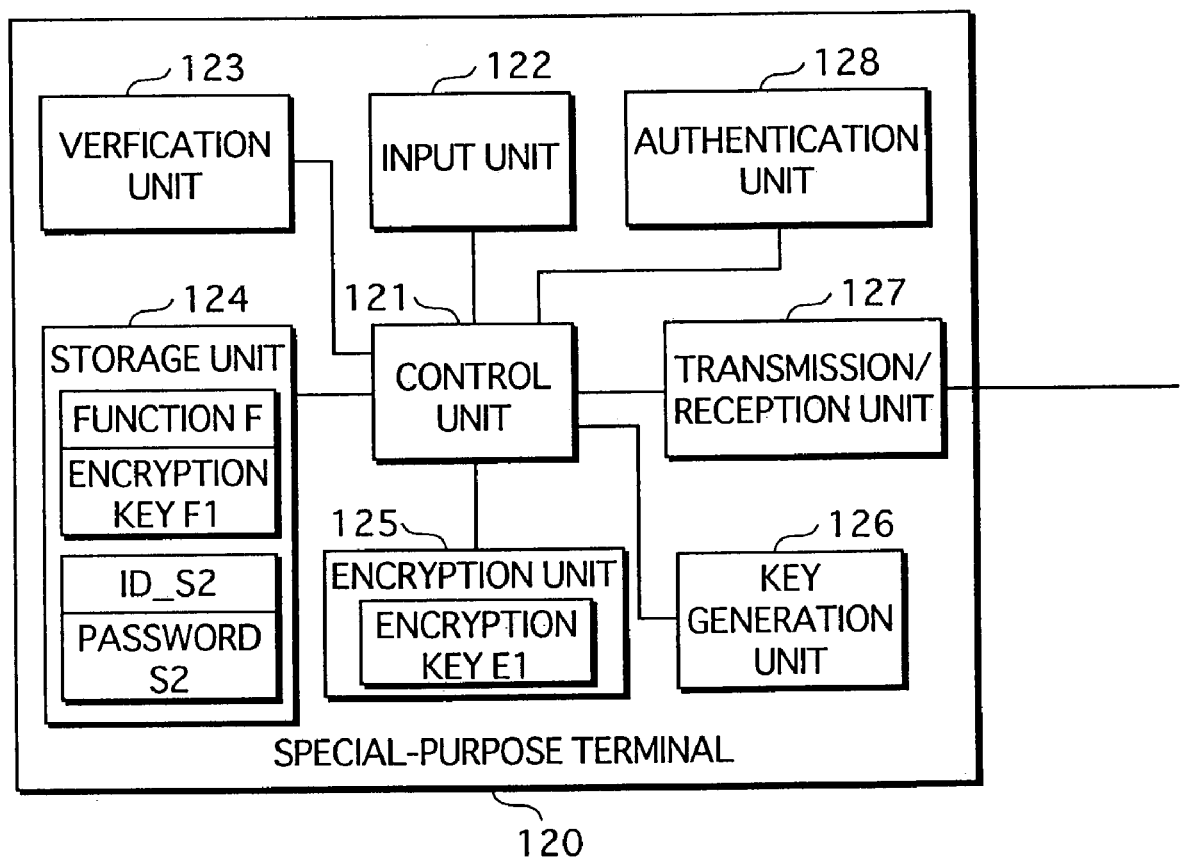
FIG. 15 is a block diagram of the special-purpose terminal 120.

As shown in FIG. 15, the terminal 120 is composed of a control unit 121, an input unit 122, a verification unit 123, a storage unit 124, an encryption unit 125, a key generation unit 126, a transmission/reception unit 127, and an authentication unit 128. The input unit 122, the verification unit 123, the key generation unit 126, the transmission/reception unit 127 and the authentication unit 128 have the same structure as the corresponding constructional elements in the terminal 100.

The following describes the storage unit 124, the encryption unit 125, and the control unit 121, whose structures differ from the terminal 100.

(1) Storage Unit 124

The storage unit 124 stores the function F, a service technician identifier ID_S2, a password S2 and an ID Module-2 that is unique to the terminal 120.

(2) Encryption Unit 125

The encryption unit 125 receives the device identifier ID4, an authentication key Key24 and Module-2 from the control unit 121, encrypts the received device identifier ID4, authentication key Key24 and Module-2 based on an encryption algorithm E, to generate an encrypted device identifier ID4, an encrypted authentication key Key24, and an encrypted Module-2. The encryption unit 125 outputs the encrypted device identifier ID4, the encrypted authentication key Key24, and the encrypted Module-2 to the control unit 121.

(3) Control Unit 121

In the same manner as the control unit 101 in the terminal 100, the control unit 121 has the verification unit 123 verify the service technician ID and the password, has the authentication unit 128 perform mutual authentication with the home server 320, and has the key generation unit 126 generate a key.

The control unit 121 receives the authentication key Key24 from the key generation unit 126, reads Module-2 from the storage unit 124, and has the encryption unit 125 encrypt the device identifier ID4, the received authentication key Key24, and the read Module-2.

The control unit 121 receives the encrypted device identifier ID4, the encrypted authentication key Key24, and the encrypted Module-2, and transmits the encrypted device identifier ID4, the encrypted authentication key Key24, and the encrypted Module-2 to the home server 320 via the transmission/reception unit 127.

2.1.3 Terminal 140

Figure 16:
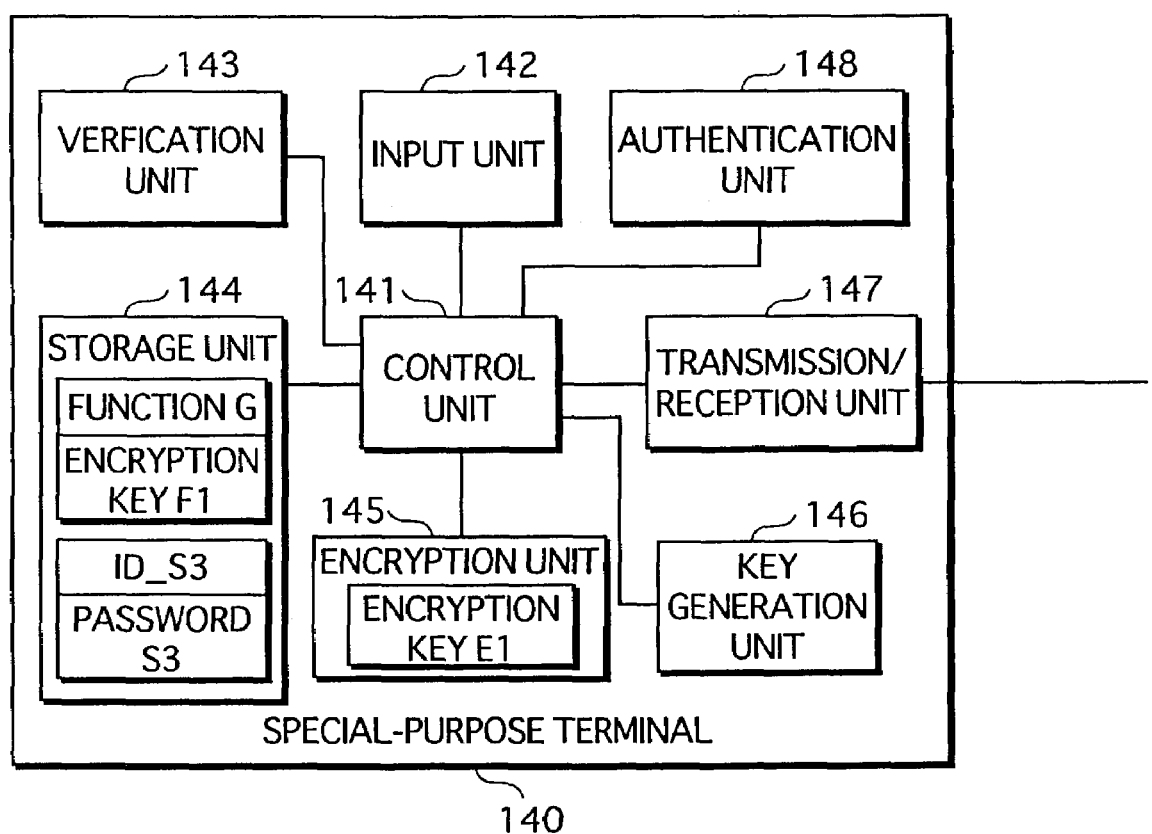
FIG. 16 is a block diagram of the special purpose terminal 140.

As shown in FIG. 16, the terminal 140 is composed of a control unit 141, an input unit 142, a verification unit 143, a storage unit 144, an encryption unit 145, a key generation unit 146, a transmission/reception unit 147 and an authentication unit 148.

The input unit 142, the verification unit 143, the encryption unit 145, the transmission/reception unit 147 and the authentication unit 148 have the same structure as the corresponding compositional elements in the terminal 120, and therefore descriptions are omitted here.

The following describes the storage unit 144, the key generation unit 146 and the control unit 141, which differ from the terminal 120.

(1) Storage Unit 144

The storage unit 144 stores a function G which is different than the function F, a service technician identifier ID_S3, a password S3 and Module-3 which is an ID that is unique to the terminal 140.

(2) Key Generation Unit 146

The key generation unit 146 receives the device identifier ID4 from the control unit 141, reads the function G from the storage unit 144, and generates an authentication key Key34 from the device identifier ID4 using the read function G. The key generation unit 146 then outputs the generated authentication key Key34 to the control unit 141. The key generation unit 146 performs the same type of processing when it receives the device identifier ID5, and outputs the authentication key Key35 to the control unit 141.

(3) Control Unit 141

In the same way as the control unit 121, the control unit 141 has the verification unit 143 verify the service technician identifier ID_S3 and the password S3, has the authentication unit 148 perform mutual authentication with the home server 320, and has the key generation unit 146 generate a key.

The control unit 141 receives the authentication key Key34 from the key generation unit 146, and reads Module-3 from the storage unit 144. The control unit 141 then has the encryption unit 145 encrypt the device identifier ID4, the received authentication key Key34 and the read Module-3.

The control unit 141 receives the encrypted device identifier ID4, the encrypted authentication key Key34 and the encrypted Module-3, and transmits the encrypted device identifier ID4, the encrypted authentication key Key34 and the encrypted Module-3 to the home server 320 via the transmission/reception unit 147.

2.1.4 Home Server 320

Figure 17:
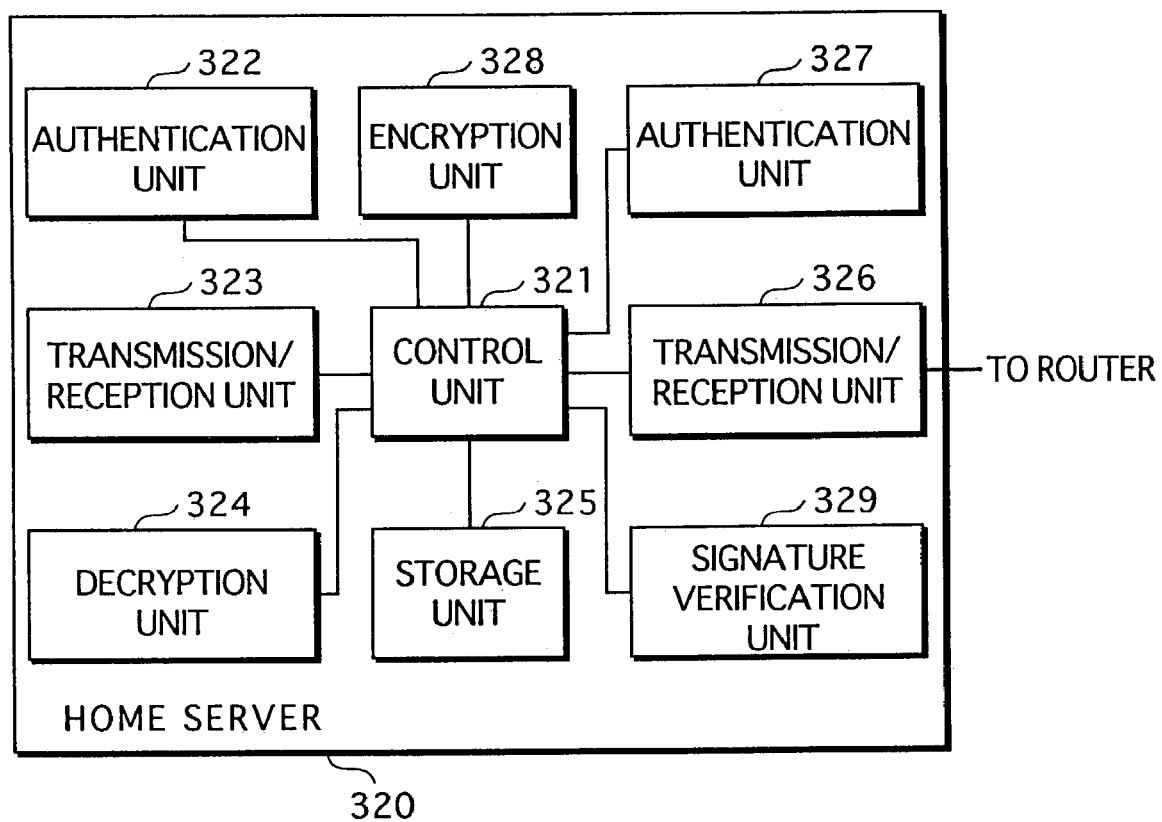
FIG. 17 is a block diagram of a home server 320.

As shown in FIG. 17, the home server 320 is composed of a control unit 321, an authentication unit 322, a transmission/reception unit 323, a decryption unit 324, a storage unit 325, a transmission/reception unit 326, an authentication unit 327, an encryption unit 328, and a signature verification unit 329.

The following describes the storage unit 325, the signature verification unit 329 and the control unit 321 which differ to the home server 300.

(1) Storage Unit 325

Figure 9:
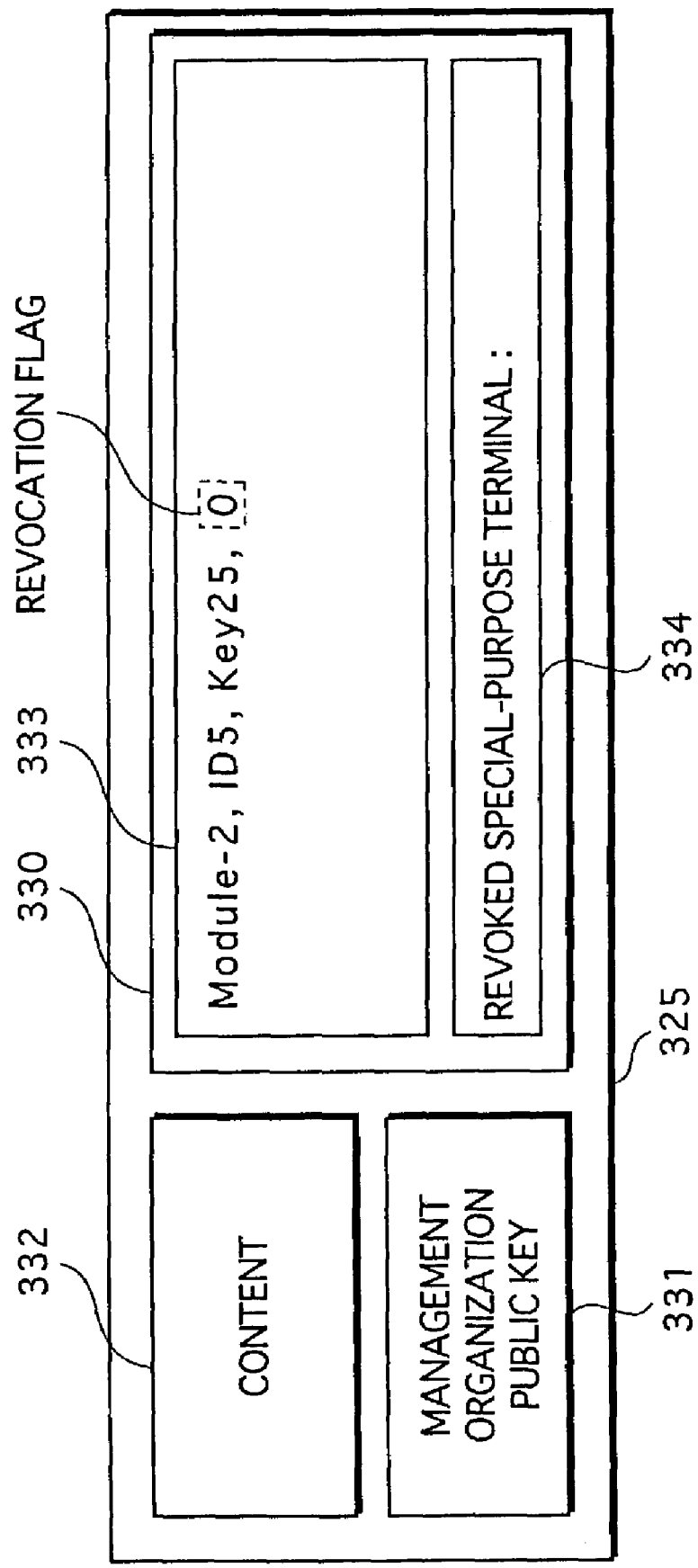
FIG. 9 is a block diagram showing the internal structure of a storage unit 325.

As shown in FIG. 9, the storage unit 325 includes a storage area 332, and storage areas 330 and 331 that cannot be observed or modified from outside.

The storage area 332 stores content distributed by the content distribution apparatus 800.

The storage area 331 stores the public key of the management apparatus 920.

As shown in FIG. 9, the storage area 330 is composed of storage areas 333 and 334.

The storage area 334 stores the ID of a revoked terminal.

The storage area 333 stores the device identifier ID5 of the TV 520 already registered in the home server 320, the authentication key Key25, Module-2 and a revocation flag in correspondence. Module-2 is the ID of the terminal 120 in which the authentication key Key25 is registered. The revocation flag shows whether the terminal in which the authentication key Key25 is registered and the keys registered using the terminal are revoked or not. The revocation flag is shown by a broken line in FIG. 9. In the second embodiment, a revocation flag set to "1" shows that the terminal shown by the corresponding ID and keys registered using the terminal are revoked, and a revocation flag set to "0" shows that the terminal and the keys are not revoked.

Figure 10:
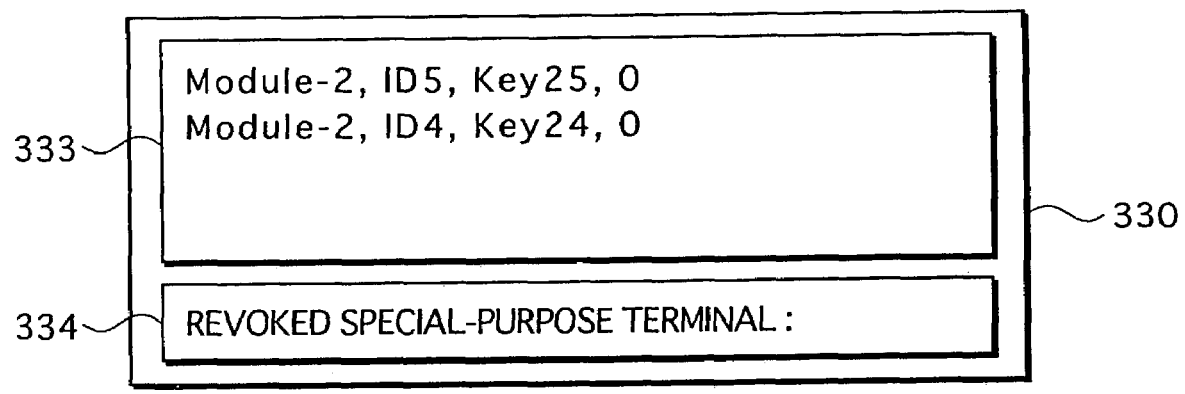
FIG. 10 is a block diagram showing the internal structure of a storage area 330 when an authentication key Key14 is stored.

The storage area 333 stores the device identifier ID4, the authentication key Key24 and Module-2 received from the control unit 321 in correspondence with the revocation flag set to "0", as shown in FIG. 10.

(2) Signature Verification Unit 329

The signature verification unit 329 receives the revocation information from the control unit 321, and verifies the signature data of the management organization 900 in the received revocation information by applying signature verification V to the signature data. Here, the signature verification V is an algorithm for validating the signature data generated according to the digital signature algorithm S. The signature verification unit 329 outputs a verification result to the control unit 321.

(3) Control Unit 321

The control unit 321 receives the encrypted device identifier ID4, the encrypted authentication key Key24 and the encrypted Module-2 from the terminal 120, and has the decryption unit 324 decrypt the encrypted device identifier ID4, the encrypted authentication key Key24 and the encrypted Module-2, in the same way as the control unit 301. The control unit 321 receives the device identifier ID4, the authentication key Key24 and Module-2 from the decryption unit 324, and writes these in correspondence with the revocation flag "0" to the storage area 333, as shown in FIG. 10.

Figure 11:
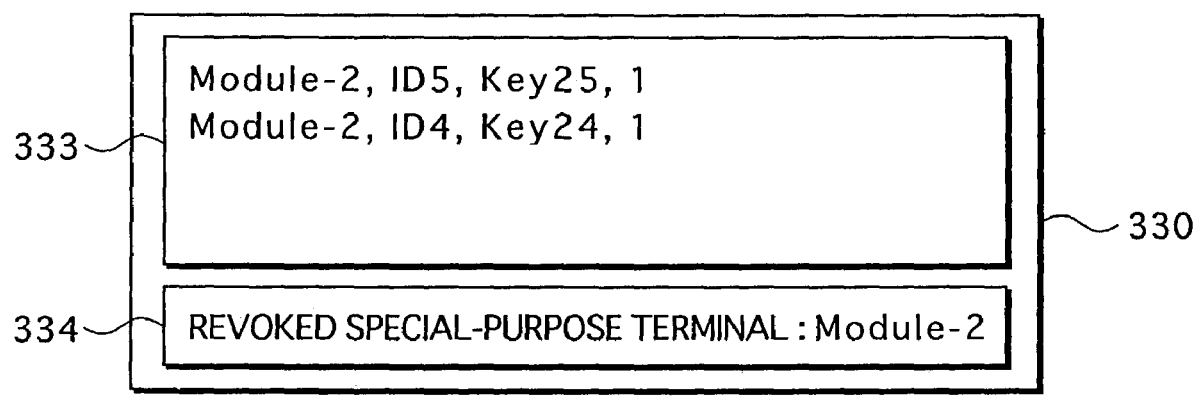
FIG. 11 is a block diagram showing the internal structure of the storage area 330 when the special-purpose terminal 120 is revoked.

The control unit 321 receives the revocation information via the router 620, and has the signature verification unit 329 verify the signature. On receiving a verification result from the signature verification unit 329, the control unit 321 judges whether the verification result is successful or not, and ends the processing when the verification result is not successful. When the verification result is successful, the control unit 321 stores the revoked terminal ID included in the received revocation information in the storage are 334, as shown in FIG. 11. In addition, the control unit 321 judges whether Module-2 stored in correspondence with the key stored in the storage area 333 and the ID included in the revocation information match. When the two match, the control unit rewrites the revocation flag "0" stored in correspondence with Module-2 to "1", as shown in FIG. 11. In this way, the authentication key Key24 and the authentication key Key25 stored in correspondence with the revocation flag "1" are shown to be revoked.

Furthermore, the control unit 321 transmits authentication key revocation information to the TVs 420 and 520. The authentication key revocation information is for notifying the TVs 420 and 520 that the authentication keys Key24 and Key25 stored in correspondence with Module-2 are revoked, and includes the authentication keys Key24 and Key25.

2.1.5 TVs 420 and 520

The TVs 420 and 520 are authorized in advance by the management organization 900.

Figure 18:
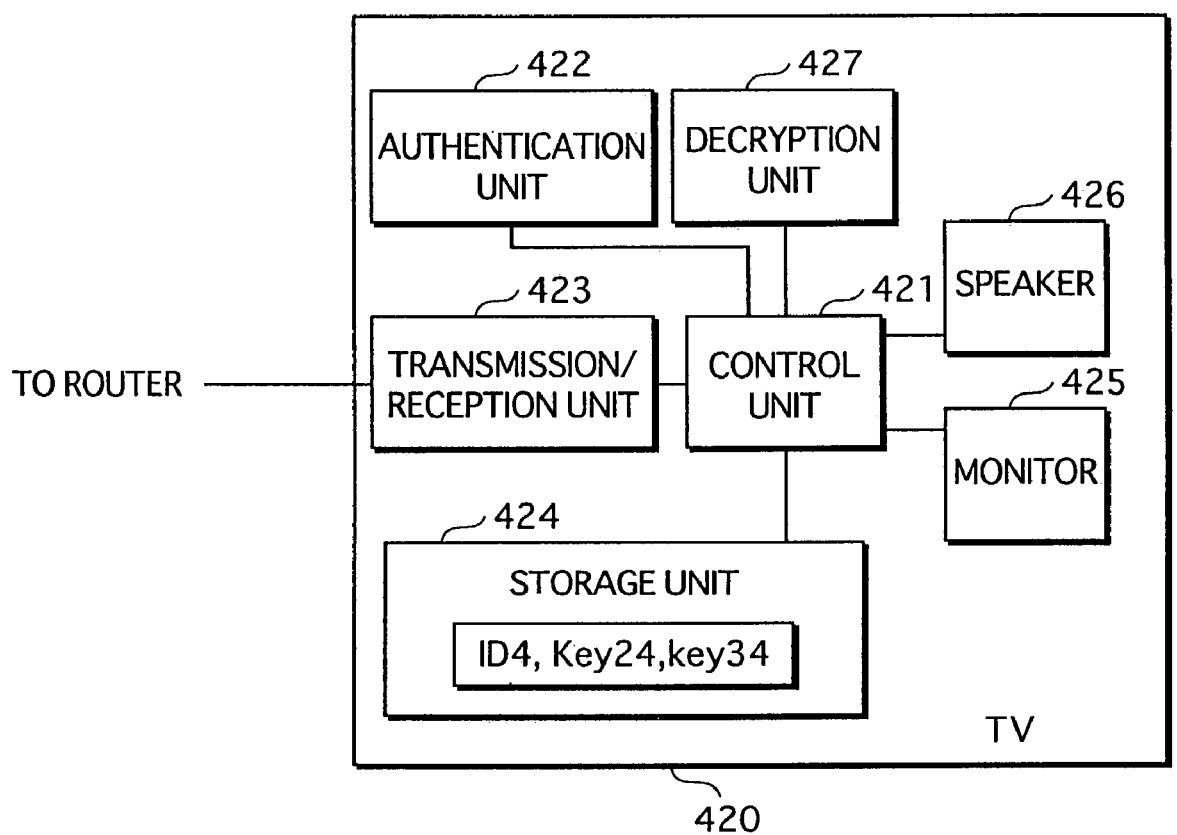
FIG. 18 is a block diagram of a TV 420.
Figure 19:
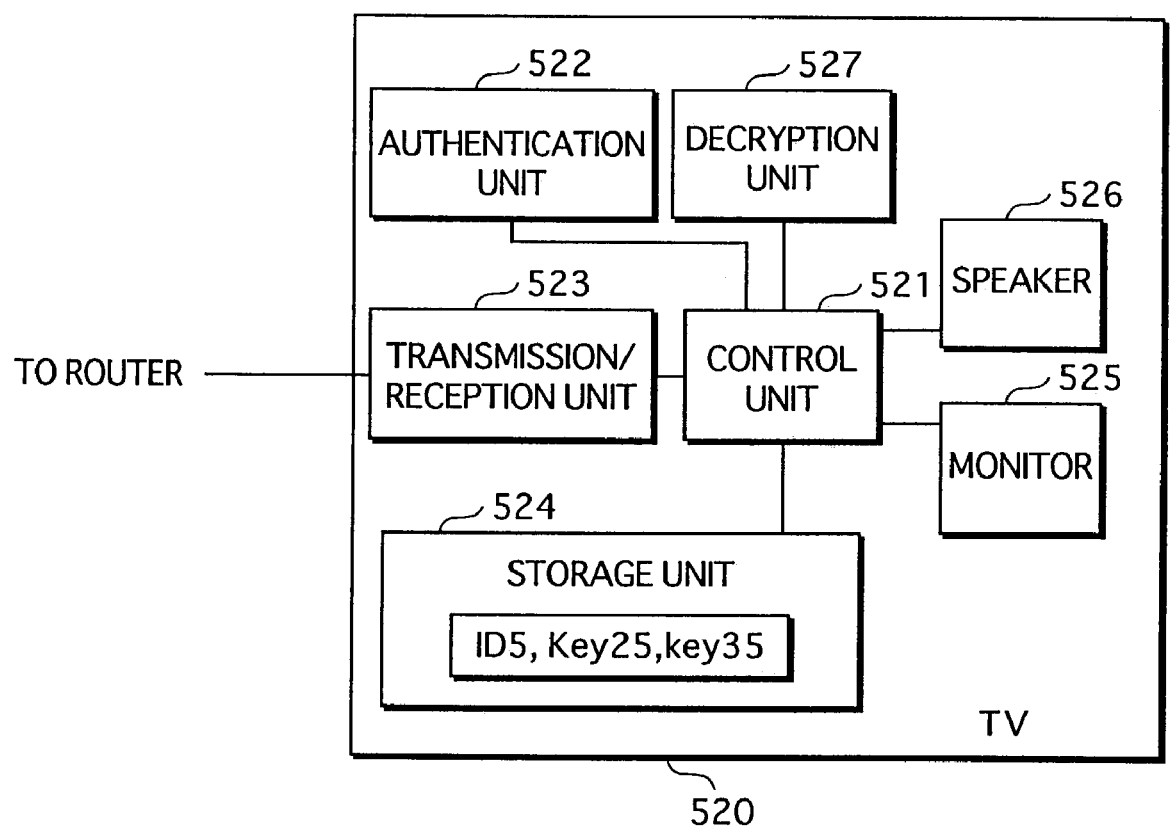
FIG. 19 is a block diagram of a TV 520.

Similar to the TV 400, the TV 420, as shown in FIG. 18, is composed of a control unit 421, an authentication unit 422, a transmission/reception unit 423, a decryption unit 427, a storage unit 424, a monitor 425 and a speaker 426. The TV 520 has the same structure and is shown in FIG. 19. The reception/transmission unit 423, the decryption unit 427, the monitor 425 and the speaker 426 are the same as the corresponding compositional elements in the TV 400. The following describes the storage unit 424, the authentication unit 422 and the control unit 421 which differ from the TV 400.

(1) Storage Unit 424

The storage unit 424 is a storage area that cannot be observed or modified from outside, and that stores the device identifier ID4 that is unique to the TV 420, the authentication key Key24, and the authentication key Key34. The authentication key Key24 has been generated from the device identifier ID4 using the function F, and the authentication key Key34 has been generated from the device identifier ID4 using the function G. A priority order for the authentication keys Key24 and Key34 has been determined in advance. The authentication key Key24 has higher priority than the authentication key Key34, and is therefore used before the authentication key Key34.

Similarly, the storage unit 524 of the TV 520 stores identifier ID5, an authentication key Key25 and an authentication key Key35. The authentication key Key25 has been generated from the device identifier ID5 using the function F, and the authentication key Key35 has been generated from the device identifier ID5 using the function G. A priority order has also been determined for the authentication key Key25 and the authentication key Key35.

(2) Authentication Unit 422

The following describes the structure of the authentication unit 422 that differs from the authentication unit 402.

When being authenticated by the home server 320, the authentication unit 422 encrypts r1r2 first using the authentication key Key24 that is highest in the priority order. When the authentication key Key24 is revoked, the authentication unit 422 encrypts r1r2 using the authentication key Key34, which is next in the priority order.

(3) Control Unit 421

The control unit 421 receives authentication key revocation information from the home server 320 via the transmission/reception unit 423, judges whether the authentication key Key24, which is highest in the priority order, matches the authentication key revocation information, and when the authentication key Key24 matches authentication key revocation information, deletes the authentication key Key24.

2.2 Operations by the Authentication System 1200

2.2.1 Operations When Registering the TV 420 in the Home Server 320 Using the Terminal 120

The following describes operations when a service technician newly connects the TV 420 to the home system 220, in which the home server 320 and the TV 520 are connected by the router 620, and sets a key in the home server 320. Note that the authentication key Key25 of the TV 520 is already registered in the home server 320.

The service technician takes the terminal 120 to the user's home. Before registration processing, the service technician inputs the service technician identifier ID_S2 and the password S2 into the terminal 120.

The control unit 121 of the terminal 120 receives the service technician identifier ID_S2 and the password S2, and has the verification unit 123 verify the service technician identifier ID_S2 and the password S2 in the same way as the terminal 100. On receiving a verification result from the verification unit 123, the control unit 121 judges whether the verification result is successful or not. The control unit 121 ends registration processing when the verification result is not successful, and continues registration processing when the verification result is successful.

The terminal 120 is connected to the home server 320 by the service technician. On the input unit 122 receiving the input of the device identifier ID4, the control unit 121 has the authentication key Key24 generated in the same way as in the first embodiment. The control unit 121 receives the authentication key Key24 from the key generation unit 126, reads Module-2 from the storage unit 124, and outputs the device identifier ID4, the authentication key Key24 and Module-2 to the encryption unit 125.

The encryption unit 125 encrypts the received device identifier ID4, authentication key Key24 and Module-2 based on the encryption algorithm E, and outputs the encrypted device identifier ID4, the encrypted authentication key Key24 and the encrypted Module-2 to the control unit 121.

The control unit 121 transmits the received encrypted device identifier ID4, encrypted authentication key Key24 and encrypted Module-2 to the home server 320 via the transmission/reception unit 127.

The control unit 321 of the home server 320 receives the encrypted device identifier ID4, the encrypted authentication key Key24 and the encrypted Module-2, and has the decryption unit 324 decrypt the encrypted device identifier ID4, the encrypted authentication key Key24 and the encrypted Module-2 in the same way as in the first embodiment.

The control unit 321 receives the decrypted device identifier ID4, authentication key Key24, and Module-2 from the decryption unit 324, reads the revoked terminal ID from the storage unit 334, and judges whether the read ID and the decrypted ID match. The control unit 321 ends the processing when the two match, and when the two do not match or when the revoked terminal ID is not stored in the storage area 334, the control unit 321 writes Module-2, the device identifier ID4, the authentication key Key24, and a revocation flag "0" in correspondence to the storage area 333.

2.2.2 Operations When the Terminal 120 is Revoked

Figure 13:
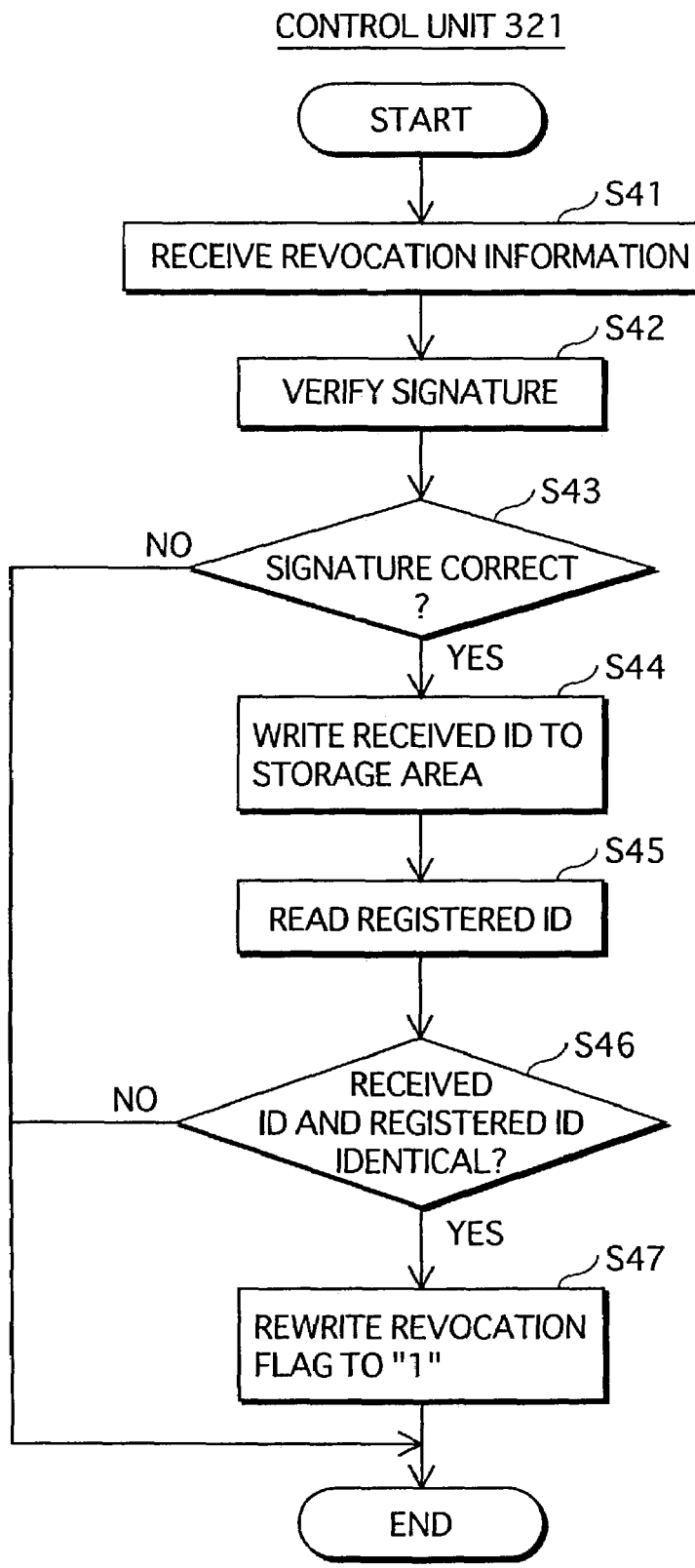
FIG. 13 is a flowchart showing operations by a control unit 321.

The following describes with use of FIG. 13 operations when revoking the terminal 120 when the terminal 120 might be used illegally due to being lost or the like.

The management apparatus 920 distributes revocation information to the home server 320 via the Internet 700.

The control unit 321 of the home server 320 receives the revocation information via the router 620 and the transmission/reception unit 326 (step S41), and has the signature verification unit 329 verify the signature data in the received revocation information (step S42).

The control unit 321 receives the verification result from the signature verification unit 329, judges whether the received verification result is success or not (step S43), and ends the processing when the verification result is not success (step S43, NO). When the verification result is success (step S43, YES), the control unit 321 writes Module-2, which is the ID of the terminal 120 included in the revocation information, to the storage area 334, as shown in FIG. 11 (step S44). In addition, the control unit 321 reads Module-2, which is the ID of the terminal 120 that generated the key authentication keys Key24 and Key25 stored in the storage area 333 (step S45), and judges whether the read Module-2 and the ID included in the revocation information match (step S46). When the two do not match (step S46, NO), the control unit 321 ends the processing. When the two match (step S46, YES), the control unit 321 rewrites the revocation flags corresponding to the authentication keys Key24 and Key25 registered using Module-2 stored in the storage area 333 to "1", in order to invalidate the authentication keys Key24 and Key25 (step S47).

Furthermore, the control unit 321 transmits authentication key revocation information that notifies that the authentication keys Key24 and Key25 have been revoked, to the TV 420 and the TV 520 via the transmission/reception unit 326.

In this way the home server 320 refuses connection by the revoked terminal 120 by registering Module-2 which is the ID of the revoked terminal 120. In addition, by revoking the authentication key Key24 and the authentication key Key25, the control unit 321 refuses authentication and usage of content to an illegally set TV, even if the TV is set illegally using the terminal 120.

2.2.3 Operations When Re-registering the TV 420 and the TV 520 Using the Terminal 140

The following describes operations when the service technician re-registers the other authentication keys Key34 and Key 35 of the TV 420 and the TV 520, respectively, using the other terminal 140, after the authentication keys Key24 and Key25 generated using the function F have been revoked.

The service technician takes the terminal 140 to the user's home. Before registration processing, the service technician inputs a service technician identifier ID_S3 and a password S3 into the terminal 140.

The control unit 141 of the terminal 140 receives input of the service technician identifier ID_S3 and the password S3 from the input unit 142, and has the verification unit 143 verify the service technician identifier ID_S3 and the password S3 in the same way as the terminal 100 is verified. On receiving the verification result from the verification unit 143, the control unit 141 judges whether the verification result is successful or not. The control unit 141 ends the registration processing when the verification result is not successful, and continues the registration processing when the verification result is successful.

The terminal 140 is connected to the home server 320 by the service technician. On the input unit 142 receiving the input of the device identifier TD4, the control unit 141 has the authentication key Key34 generated using the function G, in the same way as the terminal 100. The control unit 141 has the encryption unit 145 encrypt Module-3, which is the ID of the terminal 140, the device identifier ID4 and the generated encryption key Key34, and transmits the encrypted Module-3, the encrypted device identifier ID4 and the encrypted authentication key Key34 to the home server 320 via the transmission/reception unit 147. The control unit 141 processes in the same way when input of the device identifier ID5 is received.

Figure 12:
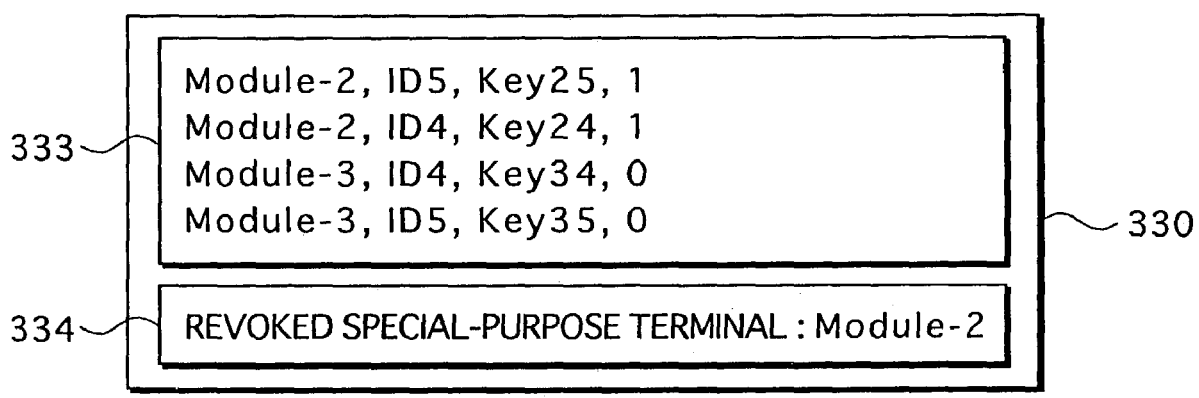
FIG. 12 is a block diagram showing the internal structure of the storage area 330 when a special-purpose terminal 140 is re-registered.

The control unit 321 of the home server 320 has the decryption unit 324 decrypt the received information, and writes Module-3, the device identifier ID4 and the authentication key Key34 received from the decryption unit 324 in correspondence with a revocation flag "0" to the storage area 333, as shown in FIG. 12. Similarly, the control unit 321 writes Module-3, the device identifier ID5 and the authentication key Key35 in correspondence with a revocation flag "0" in the storage area 333, as shown in FIG. 12.

3. Third Embodiment

In the authentication system 1200 of the second embodiment, when re-registering keys and the like, it is possible to for the keys to be registered over a network instead of the service technician setting the keys at the user's home, when it can be confirmed that the TV to be registered is at the user's home and that the TV is authorized by the management organization 900.

The following describes a structure for setting keys in the home server 320 via the Internet 700 using the terminal 140.

3.1 Structure of Authentication System 1300

Figure 14:
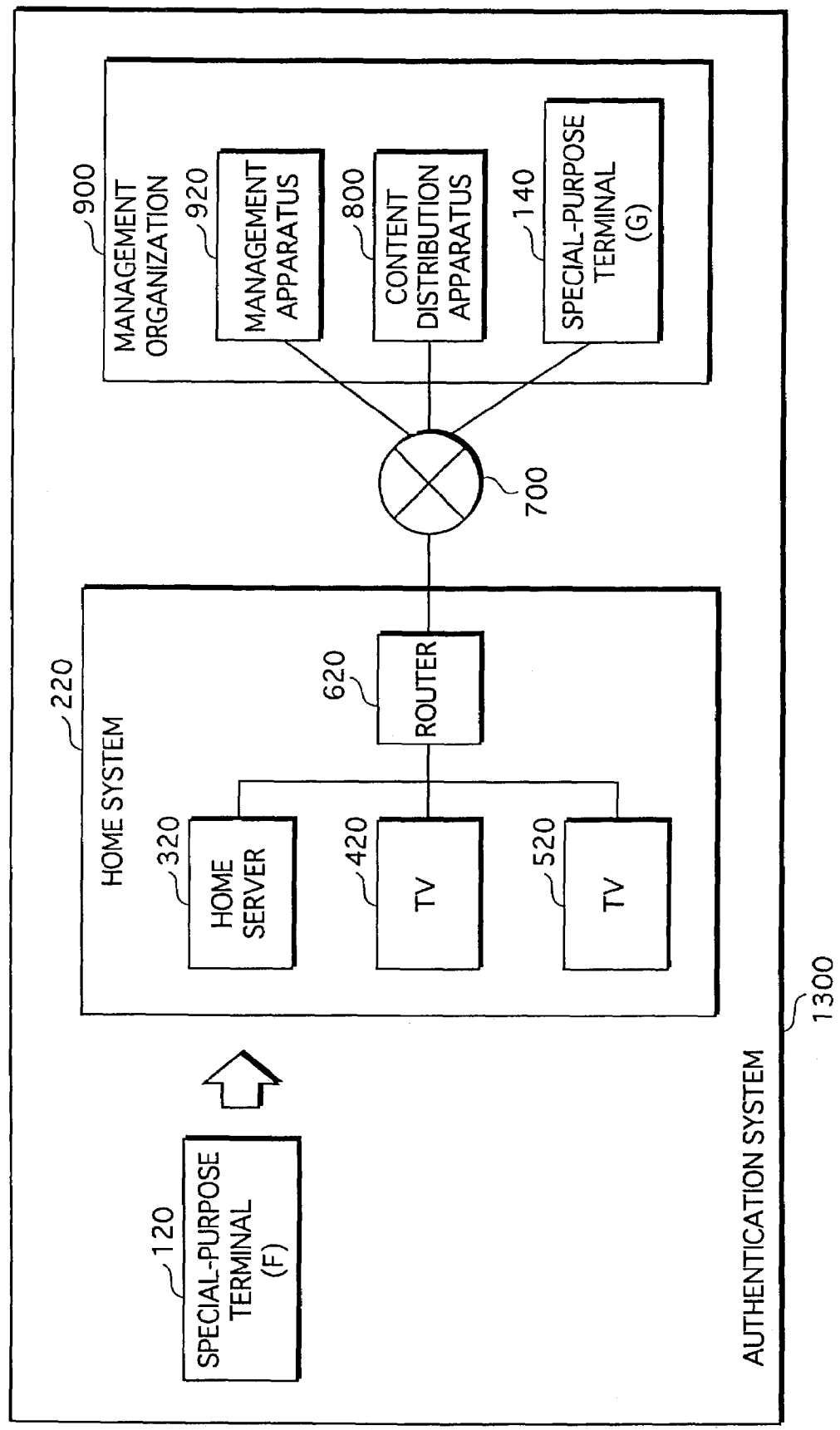
FIG. 14 is a block diagram showing the overall structure of an authentication system 1300.

As shown in FIG. 14, an authentication system 1300 is composed of the terminal 120, the terminal 140, the home system 220, the Internet 700, the management apparatus 920 and the content distribution apparatus 800. The home system 220 is composed of the home server 320, the TV 420, the TV 520, and the router 620.

The management apparatus 920, the content distribution apparatus 800 and the terminal 140 are connected to the router 620 via the Internet 700.

The following describes the structure of the authentication system 1300 that differs from the authentication system 1200.

3.2 Operations by the Authentication System 1300

3.2.1 Operations When Re-registering a Key with the Terminal 140

The following describes operations when re-registering the authentication key Key34 of the TV 420 and the authentication key Key35 of the TV 520 in the home server 320 via the Internet 700 and using the terminal 140, after the terminal 120 has been revoked, using the method of the second embodiment.

The management organization 900 is informed by the user of the device identifier ID4 of the TV 420 over the telephone. Note that the method used here is not limited to being the telephone, but e-mail or the like may be used.

The service technician inputs the service technician identifier ID_S3 and the password S3 through the input unit 142.

The control unit 141 verifies the service technician identifier ID_S3 and the password S3 in the same manner as in the second embodiment.

On being connected to the Internet 700 by the service technician, the terminal 140 performs mutual authentication with the home server 320 using the same method as the first embodiment. When mutual authentication succeeds, the authentication system 1300 secures a safe communication path connecting the terminal 140 and the home server 320. The safe communication path is realized by encrypting data on the communication path by a method such as IPsec (IP security).

The service technician inputs the device identifier ID4 from the input unit 142 of the terminal 140, at the management organization 900.

The control unit 141 of the terminal 140 receives input of the device identifier ID4 from the input unit 142, and has the authentication key Key34 generated with use of the function G using the same operations as the terminal 120. The control unit 141 has the encryption unit 145 encrypt Module-3, the device identifier ID4, and the generated authentication key Key34, and transmits the encrypted Module-3, the encrypted device identifier ID4, and the encrypted authentication key Key34 to the home server 320 via the Internet 700. The control unit 141 also processes in the same manner on receiving the device identifier ID5.

The control unit 321 of the home server 320 receives the encrypted Module-3, the encrypted device identifier ID4, and the encrypted authentication key Key34, and has the decryption unit 324 decrypt the encrypted device identifier ID4, and the encrypted authentication key Key34. The control unit 321 then writes the decrypted Module-3, device identifier ID4 and authentication key Key34, and a revocation flag "0" in correspondence to the storage area 333. The control unit 321 receives the encrypted Module-3, the encrypted device identifier ID5 and the encrypted authentication key Key35, and has them decrypted in the same manner, and writes the decrypted Module-3, device identifier ID5, authentication key Key35, and a revocation flag "0" to the storage area 333.

In this way, it is possible to set keys in the home server 320 via the Internet 700 and using the terminal 140.

4. Modifications

The present invention is not limited to the above-described embodiments, but includes cases such as the following.

(1) The revocation information is not limited to being distributed via the Internet, but instead may be distributed recorded on a recording medium such as a DVD or a CD. If this method is used, it is not necessary for the home server to be able to connect with external apparatuses.

(2) Revoked keys are not limited to being stored in correspondence with a revocation flag "1". Instead, any method that makes the revoked key unusable is possible. For example, device IDs and keys registered by the revoked special-purpose terminal may be deleted.

(3) The third embodiment is not limited to re-registering a key in the home server.

The third embodiment may be applied when newly registering a device in the home server if it can be confirmed that the device is in the home and is authorized by the management organization 900. As one example of a method for confirming that the device is in the home, the device may be registered at the management organization 900 when the user purchases the device, as a user registration card, and the user registration card used. When it can be judged what kind of device the device is, for example because part of the device ID shows that the device is a TV, it is possible to confirm whether the type of device is authorized by the management organization 900. Alternatively part of the ID may show that the device is authorized by the management organization 900.

(4) In the third embodiment, the safe communication path is not limited to being IPsec, but may be a general VPN (Virtual Private Network). Alternatively, the safe communication path may be provided physically by using a special-purpose line.

(5) Instead of the structure in the third embodiment by which the terminal 140 transmits the encrypted data to the home server 320, it is possible to have a structure by which the home server 320 retrieves data from the terminal 140 via the router 620.

(6) The special-purpose terminal may be an IC card connected to a PDA or a mobile telephone. In such a case, the functions F and G and so on, and correspondence between IDs and keys are stored in the IC card.

(7) Instead of the service technician inputting the ID of the TV through the input unit, the ID may be a barcode that is attached to the TV and that is read using the special-purpose terminal. Alternatively, the ID may be recorded in an ID chip or the like, and read by the special-purpose terminal.

(8) Although the function F and the function G are used to generate keys from the IDs in the embodiments, it is possible to use a method of expressing a correspondence between IDs and keys instead of using functions. For example, the special-purpose terminal may store a correspondence table of IDs and keys.

(9) The devices that are registered in the home server are not limited to being TVs. For example, the devices may be image playback devices or audio playback devices. Furthermore, the devices may be recording devices that write to media such as DVDs or memory cards.

The home server may be a playback device for storage media such as DVDs.

(10) The home server is not limited to distributing content to one TV as described in the embodiments, but may instead distribute content to a plurality of TVs simultaneously.

The following is an example of a method used for mutual authentication when the home server distributed content to the TV 400 and the TV 500.

First, the home server performs device authentication with each of the TVs using the method of the first embodiment. Next, the home server generates a content key for encrypting the content. The home server encrypts the generated key using the shared session keys of the TVs respectively, and distributes the respective encrypted keys together with the encrypted content to the TVs. Each TV decrypts the encrypted content key with the shared session key, decrypts the encrypted content with the decrypted content key, and plays back the decrypted content.

In this way, a plurality of TVs are able to play back the content simultaneously.

(11) Although the home server authenticates the TV 400 in the embodiments, it is possible to have a structure in which the home server and the TV perform mutual authentication.

(12) Although in the second and third embodiments each TV has two keys, i.e. a key generated using the function F and a key generated using the function G, each TV may have three or more keys. In such a case, each key is generated from the ID using a different function.

(13) The home server and TV may be connected to the router via an Ethernet™ or a locally set system, or a router may not be used at all.

(14) Content may be prohibited from being distributed from the home server to not only personal computers, but also to a recording devices.

Furthermore, in such a case, the transmission control may be performed in the following way according to the type of content.

The home server stores, together with the device ID and the key, the type of the device, for example, whether the device is for listening only, or whether the device records. The server then either permits or prohibits distribution to a device based on copy control information attached to the content. Here, the copy control information generally shows one of three types: (1) "Copy Never" meaning that the content may not be copied at all, (2) "Copy Once" meaning that the content may be copied once, and (3) "Copy Free" meaning that the content may be copied freely. The home server judges that the content may be distributed to a recording device when the copy control information is (2) or (3), and prohibits distribution to the recording device when the copy control information is (1).

(15) Although in the second embodiment the home server 320 receives revocation information and transmits authentication key revocation information to the TV 420 and the TV 520, the home server 320 may instead transmit the received revocation information to the TV 420 and the TV 520.

In this case, when registering the authentication key Key24 in the home server 320, the home server 320 receives the device identifier ID4, the authentication key Key24 and Module-2 from the terminal 120, and transmits Module-2 to the TV 420. The TV 420 stores the received Module-2 and the authentication key that is highest in the priority order in correspondence. The TV 520 processes in the same manner.

The home server 320 receives the revocation information, and transmits the received revocation information to the TVs 420 and 520. The TVs 420 and 520 each judge whether Module-2 stored in correspondence with the highest priority key and the terminal ID in the received revocation information match, and when the two match, delete Module-2.

Furthermore, all devices in the home may receive the revocation information from the management apparatus 920, and judge whether the authentication key is revoked.

(16) The TV 420 and the TV 520 are not limited to deleting a revoked authentication key on receiving authentication key revocation information. It is sufficient for the TV 420 and the TV 520 to be able to judge that the authentication key is revoked and cannot be used.

For example, if a revocation flag is attached to the authentication keys in advance, on receiving the authentication key revocation information, the TV 420 and the TV 520 may rewrite the revocation flag of the authentication key that matches the authentication key shown in the authentication key revocation information to show that the revocation key is revoked.

(17) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM, an MO, a DVD, a DVD-ROM, a DVD RAM, a BD (Blu-Ray Disc), or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted on an electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium apparatus, or by transferring the program or the digital signal via a network or the like, the program or the digital signal may be executed by another independent computer system.

(18) The present invention may be any combination of the above-described embodiments and modifications.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An authentication system comprising a first device and a second device that perform authentication, a key registration apparatus, and a key re-registration apparatus, wherein
the key registration apparatus receives input of a second device identifier unique to the second device, generates first key data from the second device identifier according to a key generation algorithm, and transmits the generated first key data to the first device,
the first device receives the first key data, stores the received first key data, and authenticates the second device with use of the first key data,
the first device further receives key revocation data that shows that the key registration apparatus is revoked and that has been generated by a management organization that manages revocation of key registration apparatuses, and revokes the first key data received from the revoked key registration apparatus,
the first device further receives third key data and the second device identifier, stores the third key data and the second device identifier in correspondence, and authenticates the second device with use of the third key data,
the second device stores a plurality of pieces of key data in advance, each piece of key data having been generated from the second device identifier according to a different key generation algorithm, selects one of the plurality of pieces of key data as second key data, the selected piece of key data having been generated according to the key generation algorithm, and is authenticated by the first device with use of the second key data, the second device receives the key revocation data, and revokes the second key data, the second device is further authenticated by the first device with use of fourth key data, the fourth key data having been selected from the plurality of pieces of key data and having been generated according to the same key generation algorithm as the third key data, and the key re-registration apparatus receives input of the second device identifier, generates the third key data from the second device identifier according to another key generation algorithm that is different than the key generation algorithm of the key registration apparatus, and transmits the generated third key data and the second device identifier to the first device.

2. The authentication system of claim 1, wherein the key revocation data further includes a unique identifier of the revoked key registration apparatus, and the first device further stores the unique identifier as a revoked identifier, receives a key registration apparatus identifier that is unique to the key registration apparatus from the key registration apparatus together with the first key data, judges whether the received key registration apparatus identifier matches the stored revoked identifier, and when the received key registration apparatus identifier is judged to match the stored revoked identifier, refuses reception of the first data from the key registration apparatus.

3. The authentication system of claim 2, wherein the key revocation data further includes signature data that has been generated by the management organization by applying a signature of the management organization to the key revocation data, and the first device verifies the signature data, and when the verification is successful, stores the key registration apparatus identifier as the revoked identifier.

4. An authentication system comprising a first device and a second device that perform authentication, a key registration apparatus, and a key re-registration apparatus, wherein the key registration apparatus is operable to receive input of a second device identifier unique to the second device, generate first key data from the second device identifier according to a first key generation algorithm, and transmit the generated first key data to the first device, the first device is operable to receive the first key data and store the received first key data, the second device is operable to store a plurality of pieces of key data in advance, each piece of key data having been generated from the second device identifier according to the first key generation algorithm or a second key generation algorithm, the first key generation algorithm being different than the second key generation algorithm, the first device is further operable to receive key revocation data that shows whether or not the key registration apparatus has been revoked, the key revocation data being generated by a management organization that manages revocation of key registration apparatuses, upon a determination that that the key registration apparatus has not been revoked, the second device is authenticated by the first device with use of the first key data and second key data, the second key data having been selected by the second device from the plurality of pieces of key data and having been generated according to the first key generation algorithm, and upon a determination that the key registration apparatus has been revoked, (1) the first device revokes the first key data received from the key registration apparatus, (2) the key re-registration apparatus receives input of the second device identifier, generates third key data from the second device identifier according to the second key generation algorithm that is different from the first key generation algorithm, and transmits the generated third key data and the second device identifier to the first device, and (3) the first device receives the third key data and the second device identifier, stores the third key data and the second device identifier in correspondence, and authenticates the second device with use of the third key data and fourth key data, the fourth key data having been selected by the second device from the plurality of pieces of key data and having been generated according to the second key generation algorithm.

5. The authentication system of claim 4, wherein the key revocation data further includes a unique identifier of the revoked key registration apparatus, and the first device further stores the unique identifier as a revoked identifier, receives a key registration apparatus identifier that is unique to the key registration apparatus from the key registration apparatus together with the first key data, judges whether the received key registration apparatus identifier matches the stored revoked identifier, and when the received key registration apparatus identifier is judged to match the stored revoked identifier, refuses reception of the first data from the key registration apparatus.

6. The authentication system of claim 5, wherein the key revocation data further includes signature data that has been generated by the management organization by applying a signature of the management organization to the key revocation data, and the first device verifies the signature data, and when the verification is successful, stores the key registration apparatus identifier as the revoked identifier.

* * * * *